US009495657B1

(12) United States Patent
Sheykh-Zade et al.

(10) Patent No.: US 9,495,657 B1
(45) Date of Patent: Nov. 15, 2016

(54) SYSTEMS AND METHODS INVOLVING FEATURES OF TERMINAL OPERATION INCLUDING TOS-AGNOSTIC AND/OR OTHER FEATURES

(71) Applicant: Ports America Group, Inc., Jersey City, NJ (US)

(72) Inventors: Irina Sheykh-Zade, San Ramon, CA (US); Teresa Duffy, Alameda, CA (US); Geeta Desai, Dublin, CA (US); Sophie Miron, San Leandro, CA (US); Chung Daniel Song, Newark, CA (US); Nathan Johnson, Paradise Valley, AZ (US); Theresa Hill, Port Richmond, CA (US); Eldar Sheykh-Zade, San Ramon, CA (US)

(73) Assignee: PORTS AMERICA GROUP, INC., Jersey City, NJ (US)

( * ) Notice: Subject to any disclaimer, the term of this patent is extended or adjusted under 35 U.S.C. 154(b) by 427 days.

(21) Appl. No.: 13/950,275

(22) Filed: Jul. 24, 2013

Related U.S. Application Data

(60) Provisional application No. 61/741,646, filed on Jul. 24, 2012.

(51) Int. Cl.
*G06Q 10/08* (2012.01)
(52) U.S. Cl.
CPC ................ *G06Q 10/0831* (2013.01)
(58) Field of Classification Search
CPC ............ H04L 69/329; H04L 67/2838; H04L 47/803; G06Q 10/06; G06Q 10/10; G06Q 10/063; G06F 17/30; G06F 9/465; G06F 9/541; G06F 9/4843
See application file for complete search history.

(56) References Cited

U.S. PATENT DOCUMENTS

| | | | |
|---|---|---|---|
| 6,817,008 B2 | 11/2004 | Ledford et al. | |
| 7,508,956 B2* | 3/2009 | Scheppmann | G06K 9/00785 348/148 |
| 7,895,094 B2 | 2/2011 | Tandon et al. | |
| 7,987,017 B2* | 7/2011 | Buzzoni | B65G 63/004 414/803 |
| 2001/0039615 A1* | 11/2001 | Bowker | G06F 8/76 713/162 |
| 2003/0009361 A1 | 1/2003 | Hancock et al. | |
| 2004/0044721 A1 | 3/2004 | Song et al. | |
| 2005/0216294 A1 | 9/2005 | Labow | |
| 2005/0246716 A1 | 11/2005 | Smith et al. | |
| 2006/0251498 A1 | 11/2006 | Buzzoni et al. | |
| 2007/0033161 A1* | 2/2007 | Park | G06Q 10/04 |
| 2007/0156505 A1 | 7/2007 | Agassi et al. | |
| 2007/0168813 A1 | 7/2007 | El Far et al. | |

(Continued)

OTHER PUBLICATIONS

International Search Report and Written Opinion in PCT application No. PCT/US13/51914, dated Mar. 18, 2014, 14 pgs.

(Continued)

*Primary Examiner* — Kevin Bates
*Assistant Examiner* — Ranjan Pant
(74) *Attorney, Agent, or Firm* — DLA Piper LLP (US); Dale S. Lazar

(57) ABSTRACT

Systems and methods are disclosed associated with processing information involving terminal operating systems. According to one illustrative implementation, an exemplary method for processing information involving terminal operating system herein may include processing data in a TOS format associated with a TOS type, converting the data into a TOS agnostic format, and performing processing using the TOS agnostic data.

28 Claims, 24 Drawing Sheets

(56) References Cited

U.S. PATENT DOCUMENTS

| | | | |
|---|---|---|---|
| 2008/0222096 A1* | 9/2008 | Ungureanasu | G06F 21/6227 |
| 2008/0252417 A1 | 10/2008 | Thomas et al. | |
| 2009/0007098 A1 | 1/2009 | Chevrette et al. | |
| 2009/0037234 A1 | 2/2009 | Gabrielson | |
| 2009/0063559 A1 | 3/2009 | Rhodes et al. | |
| 2009/0132494 A1* | 5/2009 | Gutlapalli | G06F 17/30011 |
| 2009/0150363 A1* | 6/2009 | Gross | G06F 17/30398 |
| 2009/0171500 A1 | 7/2009 | Matsumoto et al. | |
| 2009/0307039 A1 | 12/2009 | Seeds et al. | |
| 2010/0145501 A1 | 6/2010 | Guilbert et al. | |
| 2010/0161627 A1* | 6/2010 | Vossen | G06F 17/30286 707/755 |
| 2011/0010005 A1 | 1/2011 | Tan et al. | |
| 2011/0131587 A1 | 6/2011 | Rapp et al. | |
| 2011/0163159 A1 | 7/2011 | Thomas et al. | |
| 2011/0238381 A1 | 9/2011 | Edwards | |
| 2011/0251716 A1 | 10/2011 | Buzzoni et al. | |
| 2011/0264588 A1 | 10/2011 | Jensen et al. | |
| 2012/0185081 A1 | 7/2012 | King et al. | |

OTHER PUBLICATIONS

Choi, H., Park, N. and Lee, S., An ERP Approach for Container Terminal Operating Systems, Maritime Policy Management [online], Jul.-Sep. 2003, vol. 30, No. 3, pp. 197-210, [retrieved Oct. 22, 2013], retrieved from the internet http://web.itu.edu.tr/~keceli/containeri(ENG)%20an%20ERP%20approach%20for%20container%20terminal%20operating%20systems.pdf.

International Search Report and Written Opinion dated Jul. 24, 2013, in PCT Application No. PCT/US2013/000171, 15 pages.

International Preliminary Report on Patentability from PCT/US2013/051914 dated Jun. 2, 2015.

International Preliminary Report on Patentability from PCT/US2013/000171 dated Jan. 27, 2015.

File History from corresponding U.S. Appl. No. 13/987,445, filed Jul. 24, 2013.

File History from corresponding U.S. Appl. No. 13/987,447, filed Jul. 24, 2013.

File History from corresponding U.S. Appl. No. 13/987,448, filed Jul. 24, 2013.

File History from corresponding U.S. Appl. No. 14/605,994, filed Jan. 26, 2015.

Partial File History from corresponding U.S. Appl. No. 13/987,445, filed Jul. 24, 2013, retrieved from PAIR on Aug. 29, 2016.

Partial File History from corresponding U.S. Appl. No. 13/987,447, filed Jul. 24, 2013 retrieved From PAIR on Aug. 29, 2016.

Partial File History from corresponding U.S. Appl. No. 13/987,448, filed Jul. 24, 2013 retrieved from PAIR on Aug. 29, 2016.

* cited by examiner

SYSTEMS AND METHODS INVOLVING FEATURES OF TERMINAL OPERATION INCLUDING TOS-AGNOSTIC AND/OR OTHER FEATURES

CROSS-REFERENCES TO RELATED APPLICATION(S)

This application claims benefit/priority of U.S. provisional patent application No. 61/741,646, filed Jul. 24, 2012, which is incorporated herein by reference in entirety.

APPENDIX MATERIALS

Appendices, labeled "Appendix 1", "Appendix 2", "Appendix A," and "Appendix B" are attached hereto and incorporated by reference herein in their entirety.

BACKGROUND

The process of importing and exporting containers and goods at a port involves multiple parties and requires significant communication and coordination. In addition, the parties involved must adhere to numerous regulations and guidelines.

Systems known as Terminal Operating Systems (TOS) have been developed to support this process at port terminals around the world. Many of the standard operating procedures related to activities at the terminal, such as import and export functions, have become a part of these TOS applications, although they are implemented differently.

However, aspects such as exception management, real-time exception management, TOS-agnostic software/platforms/components and other interrelated functionality are areas that have not been adequately addressed by existing Terminal Operating Systems.

The shipping industry, as briefly described in FIG. 1, includes both the actual transport of goods from and to overseas, but also the interface with port facilities and third parties. As FIG. 1 shows, there are multiple parties involved in the transportation of goods through port facilities, and the port interfaces are capable of introducing delays in the overall shipping time.

For example, an SSCO (Steamship Company) may submit a booking that includes specific counts and types of containers. For each container, attributes such as dimensions, etc. are specified. When an entity associated with such container (e.g., driver etc.) comes to the terminal to process or deliver the container, the attributes of one or more containers may not match the specified attributes of the booking. In this scenario, such entity typically will not be allowed to deliver the container until the booking information matches the container.

In the past, issues such as the one described above required a significant amount of communication and paperwork between parties to understand the nature of the problem and to update or correct the information so that the entity could continue with the desired handling of the container(s).

BRIEF DESCRIPTION OF THE DRAWINGS

The accompanying drawings, which constitute a part of this specification, illustrate various implementations and features of the present inventions and together with the description, help explain aspects of the innovations herein. In the drawings.

DETAILED DESCRIPTION OF ILLUSTRATIVE IMPLEMENTATIONS

Reference will now be made in detail to various implementations, examples of which are illustrated in the accompanying drawings. In the following detailed description, numerous specific details are set forth in order to provide a sufficient understanding of the subject matter presented herein. But it will be apparent to one of ordinary skill in the art that implementations subject matter may be practiced without such specific details. Moreover, the particular implementations described herein are provided by way of example, and should not be used to limit the scope of the invention to particular embodiments. In other instances, well-known methods, procedures, components, and circuits have not been described in detail so as not to unnecessarily obscure aspects of the innovations herein.

Figure 1:
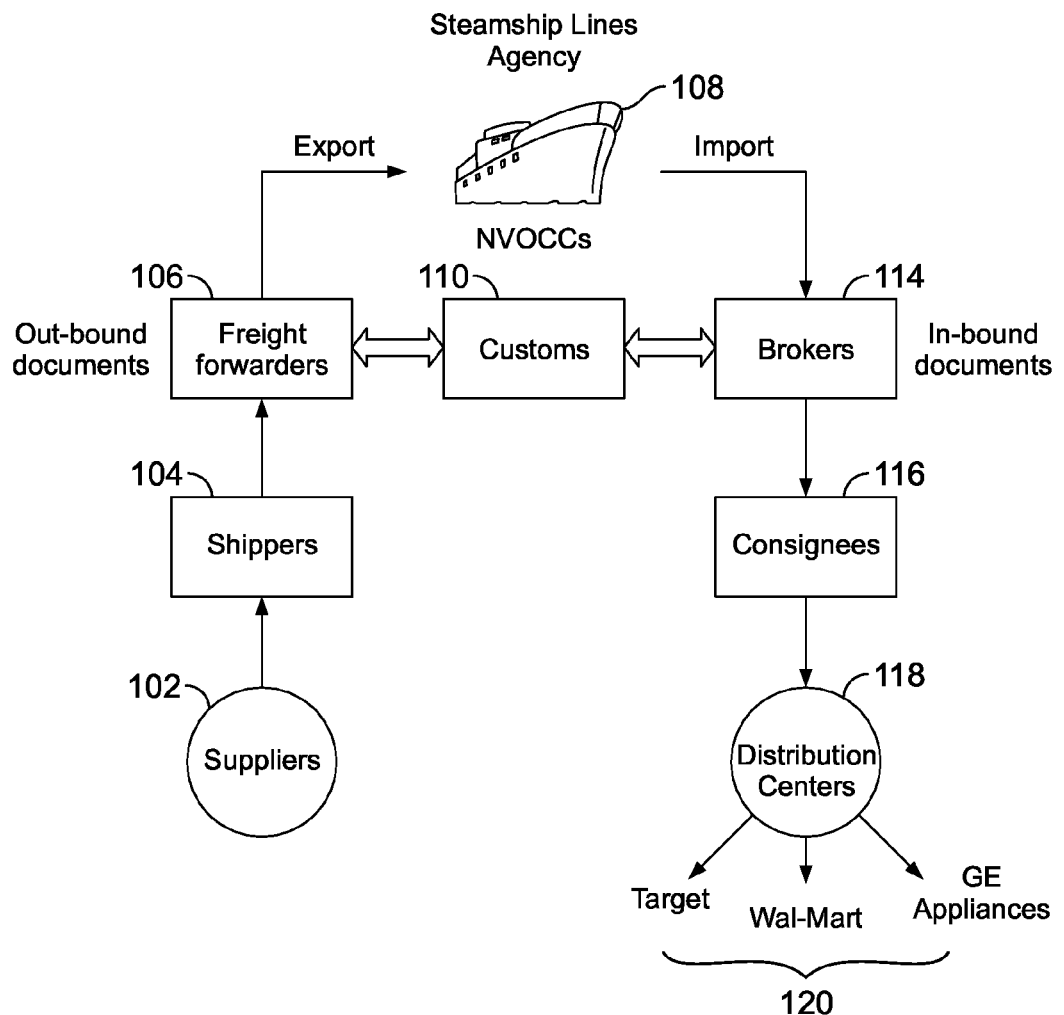
FIG. 1 is an illustration of a shipping cycle consistent with one or more aspects of the innovations herein.

FIG. 1 illustrates a shipping environment, parties involved and logistical framework. In a typical shipping cycle, for example, suppliers 102 use shippers 104 to transport freight, which is often handled by freight forwarders 106 during the freight's passage over a common carrier 108 and through customs 110. The goods are sometimes then handled by brokers 114, who deliver the goods to consignees 116 and eventually onto distribution centers 118 and retailers 120.

In accordance with aspects of the present inventions, various computer hardware, software, user interface (UI) and/or communications features may be utilized or involved in novel ways to provide the innovative systems and methods herein. According to certain embodiments, for example, an illustrative implementation may comprise a set of computer network based applications and machine readable instructions that interface with a Terminal's TOS (Terminal Operating System). In some embodiments, implementations herein are capable of providing real-time access to information and tools for SSCOs to update that information, e.g., via such interface. Consistent with the present disclosure, some implementations may drive operational efficiencies and/or improve customer service. Some additional beneficial characteristics of various implementations may include, for example, one or more of the following: minimizing cargo movement problems at the terminal; improving terminal operators' ability to successfully service SSCOs and carriers; removing terminals from the role of broker between trucking and steamship companies; eliminating reliance on phone, fax and other non-electronic instructions to the terminal; delivering real-time, accurate information carriers can use to quickly pass through terminal gates; preventing terminal/gate congestion; and/or expedited trouble resolution resulting in improved turn-times for entities transferring freight/cargo.

Various implementations herein have the capability of minimizing communication and can streamline various aspects of the processes. Further, some implementations may also accomplish benefits herein by interfacing with other applications, such as an associated tracking application. Here, for example such application may facilitate logistical information sharing and communication flow among members of the shipping industry.

For example, via features and functionality associated with the present systems and methods, implementations herein may allow SSCOs to be alerted when trouble occurs at a terminal. In addition, the SSCOs may be presented with the specifics of each issue and quick links to access, review and update their data related to the issue. Once the data has been corrected, the operating entity (e.g., driver, etc.) and terminal clerk can then proceed with their transactions.

As a function of these systems, methods and features herein, inventions herein possess capabilities and yield abilities to give terminals network-based visibility and functionality from a variety of places at any time. Terminals can view live trouble transactions by category, status, equipment number or gate pass number, with details of the same printed trouble tickets that the driver receives. In some implementations, a trouble page within the TOS web portal provides terminal operators with the ability to expedite resolutions.

Additionally, system and methods of some implementations may provide user access to real-time vessel schedules, import and export container information, gate activity, and/ or user account information generated from a TOS. The terminal administrators can set up terminal-specific configuration and information; perform user account management and setup for automatic send of emails or faxes to users.

Figure 2:
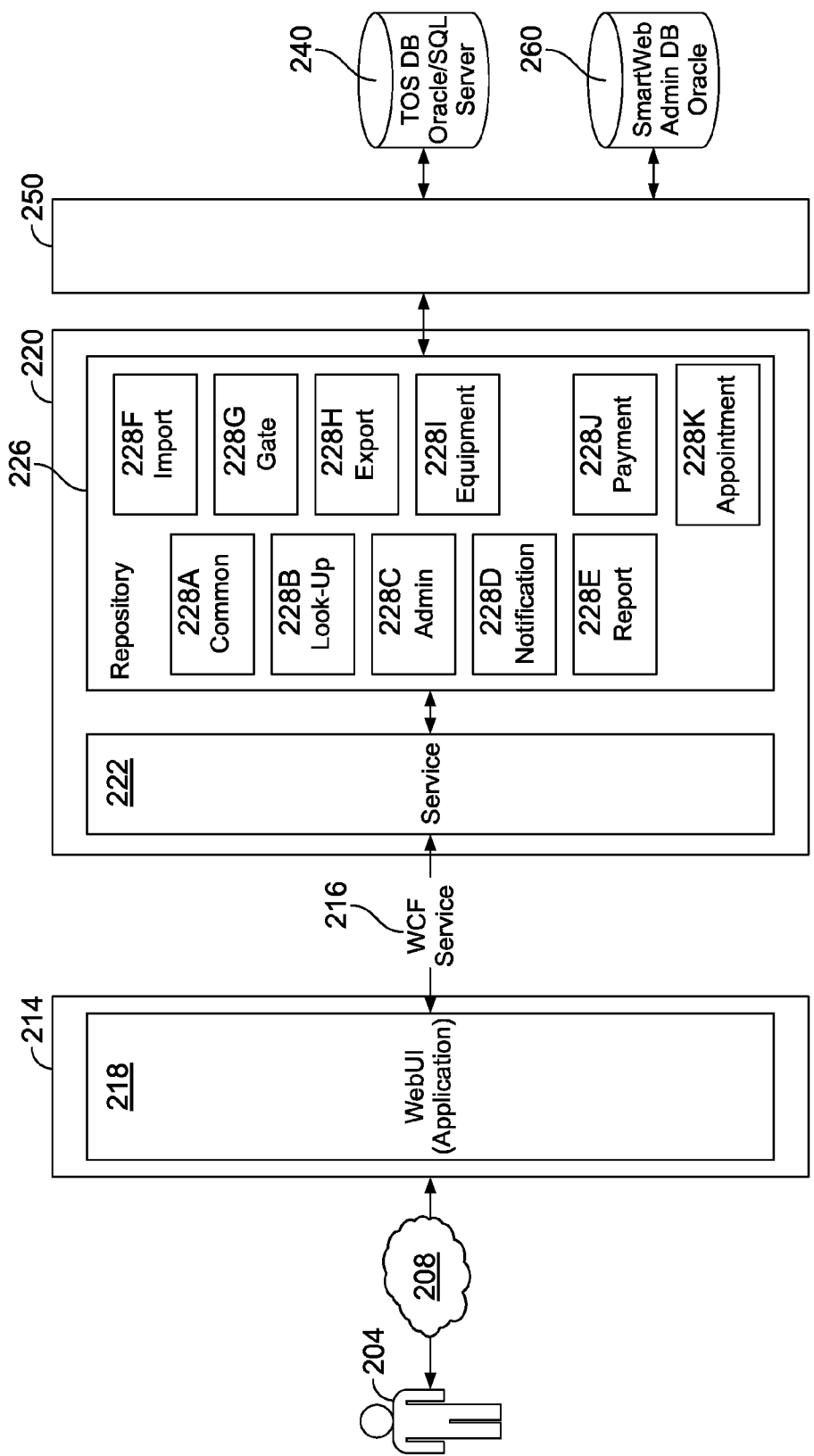
FIG. 2 is a block diagram of a Terminal Operating System consistent with one or more aspects of the innovations herein.

FIG. 2 details exemplary architecture of some illustrative implementations used to employ particular methods, which may be layered, module based and/or TOS agnostic. Examples of various features shown here are described below.

Layered Architecture

According to some implementations, innovative layered architecture(s) herein are capable of providing separation of concerns and factoring of code, which may also give a good maintainability and the ability to split out layers into separate physical tiers for scalability purposes. In one inception, innovations herein may perform processing and/or operate in four layers: Presentation 214, Service 222, Business Logic 220 and Data Access 250 layers. Here, the attached Appendices/computer program (CD) materials illustrate specific aspects and interrelations of the features described below and elsewhere herein.

Figure 3A:
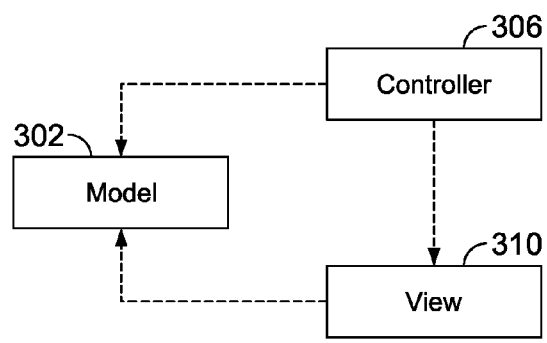
FIGS. 3A-3B are block diagrams of illustrative model, view and controller applications, components and/or interactions as may be associated with implementations of Terminal Operating Systems consistent with one or more aspects of the innovations herein.
Figure 3B:
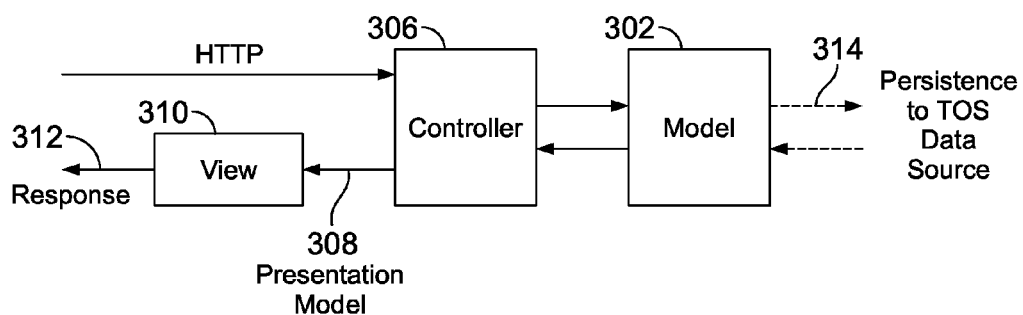

Referring to FIGS. 2 and 3, an illustrative system is shown in FIG. 2 including a representation of an exemplary Presentation Layer 214, which may be built on ASP.NET, and may include or involve components of a Model-View Controller (MVC) framework, e.g. as set forth in FIGS. 3A and 3B, able to implement the Model-View-Controller pattern. Such MVC pattern may separate the modeling of the domain, the presentation, and the actions based on user input 204 into three separate classes:

Model. The model 302 may contain or represents the data with which the user works. This can be either View Model or Domain Model. The model 302 manages the behavior and data of the application domain, responds to requests for information about its state (usually from the view), and responds to instructions to change state (usually from the controller).

View. The view 310 manages the display of information. Views may be utilized to render some part of the model 302 as a user interface ("UI").

Controller. The controller 306 interprets the mouse and keyboard inputs from the user 204, informing the model 302 and/or the view 310 to change as appropriate.

Exemplary details of such MVC framework are found in FIG. 3A which shows an example structural relationship between the three objects. Further, FIG. 3B shows an example set of Interactions in an MVC Application. In this example, the controller 306 incorporates HTTP input, and provides output represented as data in the model 302, which in some implementations may persist in a relational database 314. Finally, the controller may feed such data to the view 310 via a presentation model 308, which governs how the data are displayed, and may prompt or interact with a user regarding a response 312. For example, the controller receives HTTP messages which include details of user requests. Once the controller receives user request, the controller creates a model to process the request and uses it to communicate with database. The model is filled with information from database or used to update database. The model is then used to create a View that will be returned as a response.

Referring again to FIG. 2, a representative Service Layer 222 is shown, wherein an application's boundary with a layer may be defined that establishes a set of available operations and coordinates the application's response in each operation, the service layer 222 may include the service contracts and operation contracts that are used to define the service interfaces that will be exposed at the service boundary. Data contracts may also be defined to pass in and out of the service.

In one example instantiation, the invention may implement a WCF (Windows Communication Foundation) service 216, a framework for building service-oriented applications. However, in such instantiation(s), the service boundaries may be explicit, which means hiding all the details of the implementation behind the service boundary 222. This includes revealing or dictating what particular technology was used.

Figure 4:
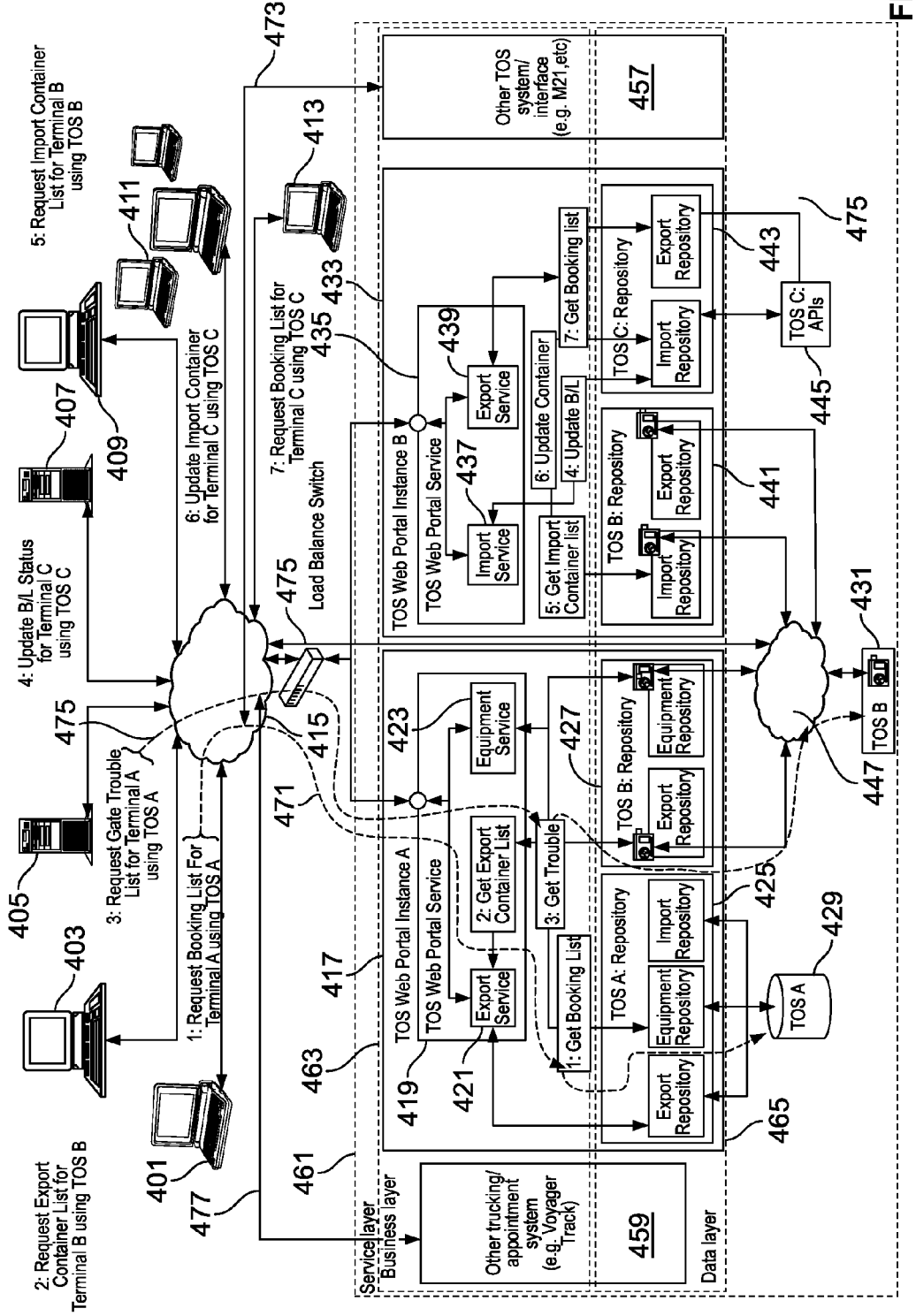
FIG. 4 is a block diagram showing various entities and interactions within or among such entities and an illustrative web- or network-based system consistent with one or more aspects of the innovations herein.

FIG. 4 is a block diagram showing various entities and interactions within or among such entities and an illustrative web- or network-based system consistent with one or more aspects of the innovations herein. Terminal Operating System information may be input by a device 401-413 that includes, but is not limited to a computer, laptop, mobile device, server, etc. that may request and obtain terminal information from any of a plurality of Terminal Operating Systems 429, 431 and 445. Any of the data requests 1-7 may be input at any of the devices 401-413. The requests for information are transmitted through a network 415 to a TOS web portal instance A 417 or TOS web portal instance B 433. In FIG. 4, requests 1-3 are processed by web portal A 417 and requests 4-7 are processed by web portal instance B 433. The request 1 is a request for the booking list for Terminal A that operates under the Terminal Operating System A. The request is routed to the web portal instance A and processed by the export service 421. A GetBookingList method is called by the export service to the TOS A repository 425, and specifically the export repository, where the booking list is obtained. If the requested booking repository type is already cached, then the data is retrieved from TOS A database 429 using the repository instance. However, if the requested booking repository type is not in the repository cache, then the repository instance is created and added to the cache. This newly created repository instance is utilized to retrieve the booking listing from the TOS A database 429. Once retrieved, the booking list information that is provided in the TOS A format is mapped by the repository 425 into a TOS agnostic format such as a business entity or business object format that is processed and presented to the user in the same manner, no matter which TOS the data is obtained from. Conversion from the TOS agnostic format to a TOS specific format is performed in the repository. Accordingly, all the data requests/commands inputted by any of the devices 401-413 are processed in a TOS agnostic format. Only when interfacing directly with the Terminal Operating Systems are the TOS agnostic data converted into data formats compatible with the different Terminal Operating Systems. Thus, a user is able to interact with a plurality of Terminal Operating Systems from a single device without concern for the Terminal Operating System employed by each terminal.

A similar process occurs for each of the remaining requests 2-7, with differences in which web portal instance, service and repository are accessed. For example, a user at device 403 requests an export container list (#2) for a Terminal B that operates using a Terminal Operating System B different from the Terminal Operating System A. The request 2 for the export container list is routed to the export service 421 of the web portal instance 417. A GetExportContainerList method is called to an export repository of the TOS B repository 427. This export repository retrieves the requested export container list from the web portal service TOS B 431 via a network 447. The web portal instance A 417 returns the export container list 403 to the device 403.

A user at device 407 may input an update for a bill of lading (B/L) status for a Terminal C using a Terminal Operating System C. The update is input in a TOS agnostic data format. The update is transmitted to the import service 437 of the web portal instance B 433. An update B/L method is called by the import service 437 to the import repository of the TOS C repository 443. Within the TOS C repository 443, the import repository maps the user input of the B/L update status into the TOS C data format and transmits the update to the TOS C API 445. In response, the TOS C API 445 may transmit an acknowledgement or other reply to the TOS C repository 443. The TOS C repository 443 transforms any data in the TOS C format into the TOS agnostic format and returns the relevant information to the device 407. Taking one more example, a user at device 413 inputs a request for booking list information for the Terminal C that operates using a TOS C that is different from TOS A and TOS B. The request is forwarded to an export service 439 of the web portal instance B 433. The export service 439 calls a GetBookingList method to the export repository of the TOS C repository 443.

Referring to FIG. 4, interrelations with other entities, such as a trucking/appointment system 459 (e.g., a system like VoyagerTrack, etc.) and another TOS system/interface 457 (e.g., a system like M21, etc.) are shown. By features herein, information and data may be processed throughout the service layers of any such systems or entities. For example, a request 477 from a trucking/appointment system 459 may be processed consonant with a request 475 regarding gate trouble (#3) from entity 405. Also by way of example, a request 473 from another TOS system/interface 457 may be processed consonant with a request 471 for a booking list (#1) from entity 401.

Figure 5:
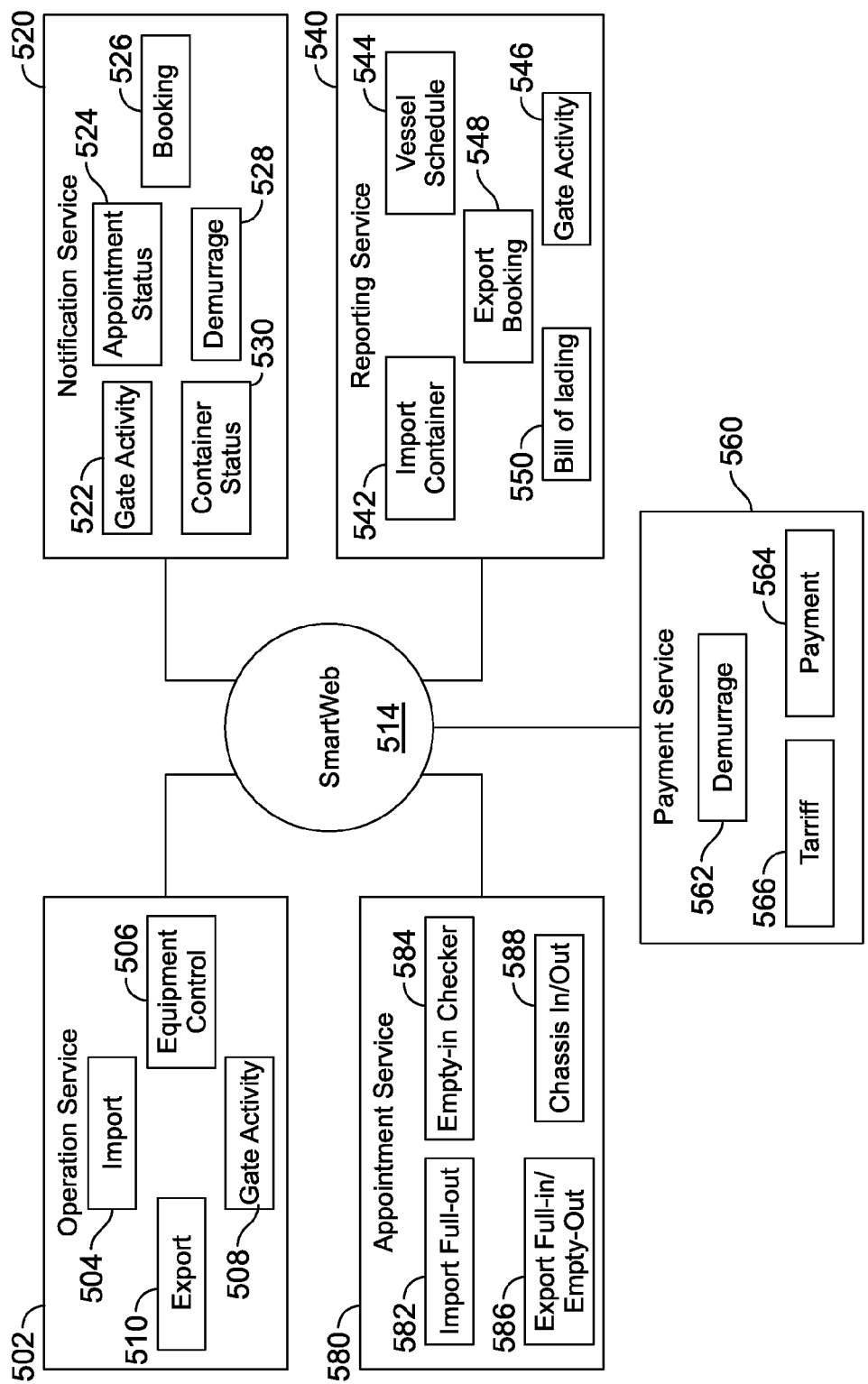
FIG. 5 is a block diagram depicting various exemplary features, services or components involved with present TOS web portal implementations consistent with one or more aspects of the innovations herein.

FIG. 5 is a block diagram depicting various exemplary features, services or components involved with present TOS web portal implementations 514 consistent with one or more aspects of the innovations herein. Referring to FIG. 5, implementations of the present systems may include or involve components such as an operation service 502, an appointment service 580, a payment service 560, a notification service 520 and/or report service 540, among other such components. Some of these example services are shown in FIG. 5. In some illustrative implementations, the operation service 502 component may include a subcomponent service to handle import 504, export 510, equipment control 506, and gate activity 508. Similarly, an illustrative notification service 520 may include subcomponent services for gate activity 522, appointment status 524, booking 526, demurrage 528, and container status 530. The reporting service 540 may include subcomponent services for import container 542, vessel schedule 544, export booking 548, gate activity 546, bill of lading 550. The payment service 560 may include subcomponent services for demurrage 562, tariff 566, and payment 564. The appointment service 580 may include subcomponent services for import full-out 582, empty-in checker 584, export full-in/empty-out 586, and chassis in/out 588.

In another example, the service layer 222 is compiled into a separate class assembly and hosted in a service host environment. The application layer 214 only knows about and has access to this layer. Whenever a request is receive by the service layer 222, the request is dispatched to the repository 226 and the business logic layer performs the work. If any database support is needed by the repository 226, it goes through the data access layer 250.

Referring again to FIG. 2, the third layer in this illustrated example is the Business Logic Layer 220. Such business logics associated with TOS web portal 514 implementations herein may be represented by a domain model which is a conceptual layer that represents the TOS web portal 514 business domain. Such domain model(s) may freely mingle data and process, have multi-valued attributes and a web of associations, and uses inheritance.

According to one illustrative TOS web portal 514 implementation, the domain model may be configured to look like the database design with mostly one domain object for each database table. Further, here, because the behavior of the business is subject to change, it is important to be able to modify, build, and test this layer easily. As such, minimum coupling features from the domain model to other layers in the system may be implemented.

Entities.

Figure 6:
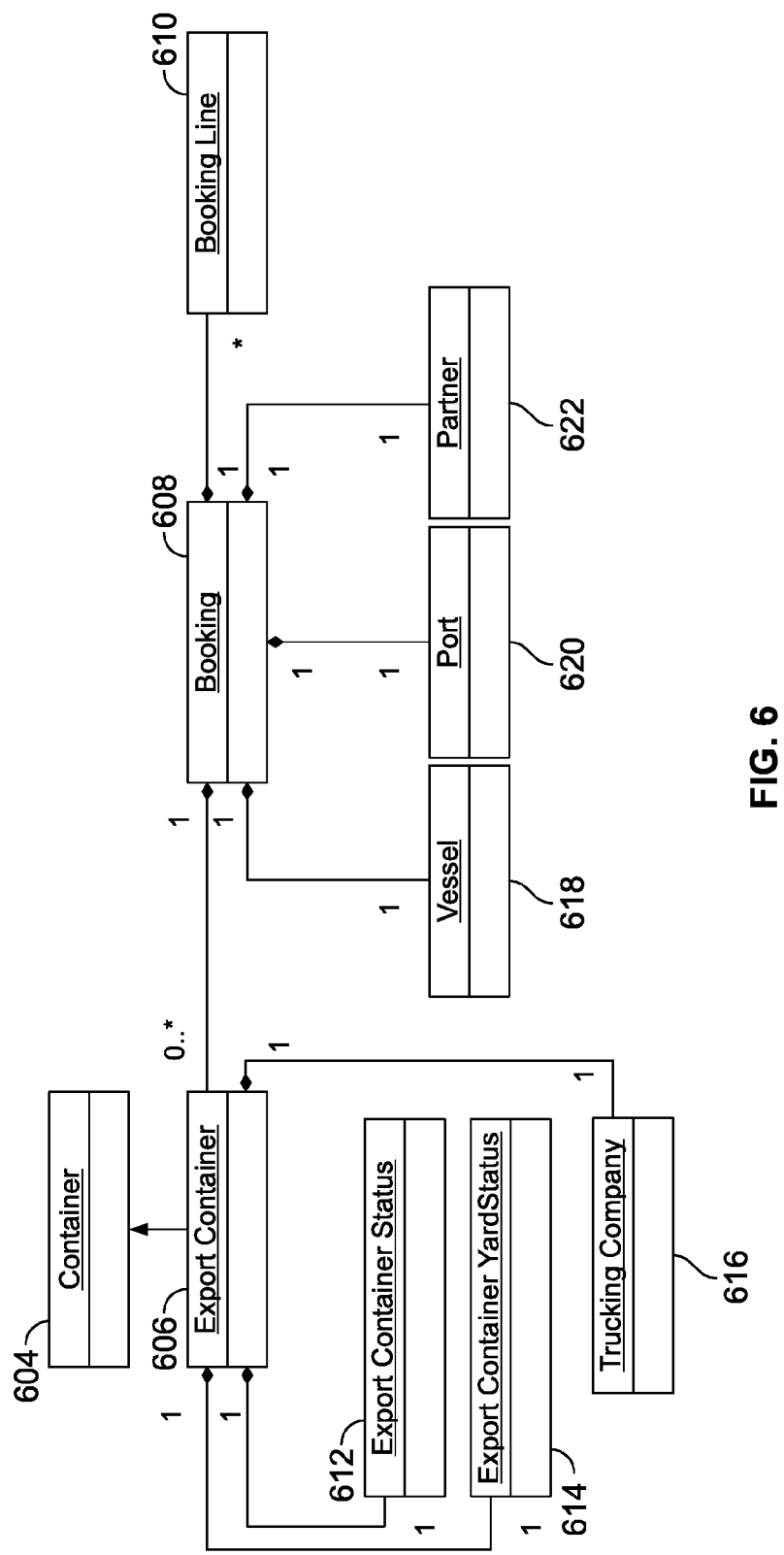
FIG. 6 is a block diagram depicting exemplary booking module aspects and entities consistent with one or more aspects of the innovations herein.

Implementations of such TOS web portal 514 may define business object as an entity, such as Bill of Lading, Container, Equipment, Booking, Release, etc. Each entity may represent some meaningful individual in business domain. These objects mimic the data in business and objects that capture the rules the business uses. Inheritance, compositions, aggregation relationships are defined among those entities. FIG. 6 depicts an example of Entities in the Booking Module. A Booking Entity has Vessel, Port, Partner and Booking Line entities as properties and there are one-to-one relationships between them except Booking Line. Booking and Booking Line has one-to-many relationships. Booking entity might have one or more Export Container entities which are inherited from Container object. Export Container entity has Export Container Status, Export Container Yard Status, and Trucking Company entities as properties and has one-to-one relationship. Here, for example, such booking object 608 may have vessels 618, port 620, partners 622 objects, as well as trucking company 616 and status of export containers 606.

Repository.

Referring once again to FIG. 2, the repository 226 mediates between the data source layer 250 and the business layers 220 of the application. In some implementations, it queries the data source for the data, maps the data from the data source to a business entity, and persists changes in the business entity, and presents changes to the data source. Further, the repository 226 may separate the business logic from the interactions with the underlying data sources.

Referring once again to FIG. 2, the fourth layer of the example is the data access layer 250. In some implementations, the data access layer 250 is the layer that is solely responsible for talking to the data store and persisting and retrieving business objects. The layer typically includes all the create, read, update and delete (CRUD) methods, transaction management, data concurrency, as well as a querying mechanism to enable the business logic layer to retrieve object for any given criteria.

Module Based Applications

In certain instances of the system and method here, such TOS web portal 514 may be a module-based application and is capable of having a collection of modules that can be added and removed independently. Each module may be defined as a .NET assembly (dynamic link library assembly) within the TOS web portal 514. Further, a module can be responsible for exposing business logic to a client which is any entity that uses the module.

If a user desires to modify a module implementation, changes may be constrained to that module only. Such module-based architecture allows modules and clients to evolve separately. New versions of the existing module can be deployed without affecting existing client applications. Also new version of the existing client application can be deployed without affecting existing modules.

Figure 7:
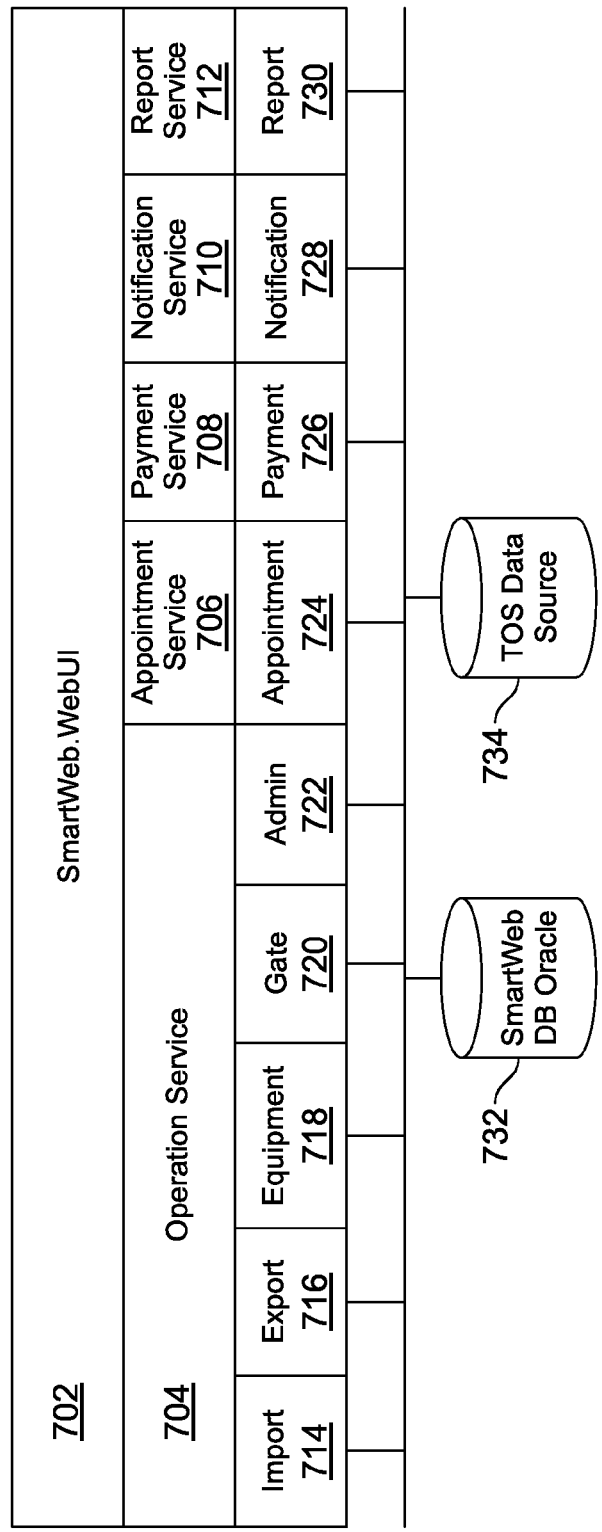
FIG. 7 is a diagram showing exemplary hierarchy and structure of illustrative web-based modules consistent with one or more aspects of the innovations herein.

According to some implementations herein, development of modules in such TOS web portal implementations may have one or more of the following characteristics, some of which are depicted in FIG. 7:

Interface-Based Programming

Characterizing separation of interface from implementation. Here, for example, the client may be coded against an abstraction of a service (the interface), not a particular implementation of it (the object). As a result, changing an implementation detail on the server side or even switching to a different service provider does not affect the client.

Location Transparency

TOS web portal implementations 514 may contain multiple modules. These modules can all exist in the same process, in different processes on the same machine, or on the different machines on a network. However, there may not be anything in the client's code pertaining to where the objects execute.

Versioning Support

Implementations herein may deploy new versions or updated versions of existing modules without affecting other modules. As a result, a module can be allowed to evolve along different paths and different versions of the same module can be deployed on the same machine, or even in the same client process, side by side.

Further, embodiments of TOS web portal 514 herein may include, involve and/or have access to capabilities of import 714, export 716, gate 720 and equipment control modules 718 that are able to replace traditional functionalities in existing systems and report 730, appointment 724, payment 726 and notification modules 728 for associated tracking applications/components and admin module 722 that combines both applications.

TOS Agnostic

Some implementations or instantiations of the system and methods disclosed herein may include a TOS Agnostic design. That is, the system is configured so that operation may occur without 'care' for various processing as to which TOS it is dealing with. In the context of the frameworks set forth above, for example, such implementations may include configuration(s) as a Repository-Pattern. The repository pattern is used to enable Terminal Operating System (TOS) independence. Each TOS may utilize its own unique database schema.

Figure 8:
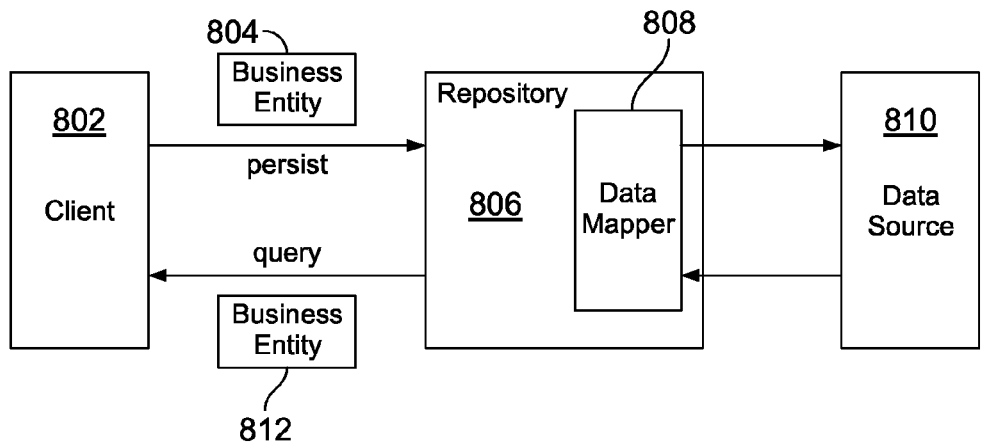
FIG. 8 is a block diagram showing illustrative aspects of repository mapping from TOS to business entities consistent with one or more aspects of the innovations herein.

FIG. 8 is a block diagram showing illustrative aspects of repository mapping from TOS to business entities consistent with one or more aspects of the innovations herein. Referring to FIG. 8, an illustrative repository 806 may separate the logic that retrieves the data and map it to the entity model from the business logic that acts on the model. Further, the business logic may be agnostic to the type of data that comprises the data source layer 810. For example, the data source layer 810 can be a database or a Web service. FIG. 8 shows an example repository mapping from TOS to business entities 804, 812.

Figure 9:
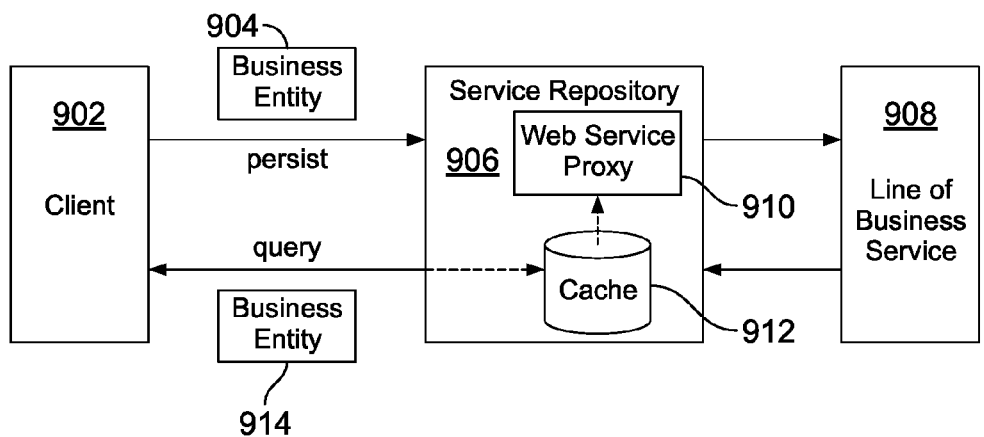
FIG. 9 is a diagram showing an illustrative repository caching scheme consistent with one or more aspects of the innovations herein.

FIG. 9 is a diagram showing an illustrative repository caching scheme consistent with one or more aspects of the innovations herein. Here, for example, a backing store for data can be a business service that is exposed by a line-of-business (LOB) application 908. Services are often expensive to invoke and benefit from caching strategies that are implemented within the repository 906. In such cases, the query logic in the repository 906 may first check to see whether the queried repository instance are in the cache 912. If they are not, the repository 906 accesses the Web service to retrieve the information. Such illustrative caching scheme is shown in FIG. 9.

Figure 10:
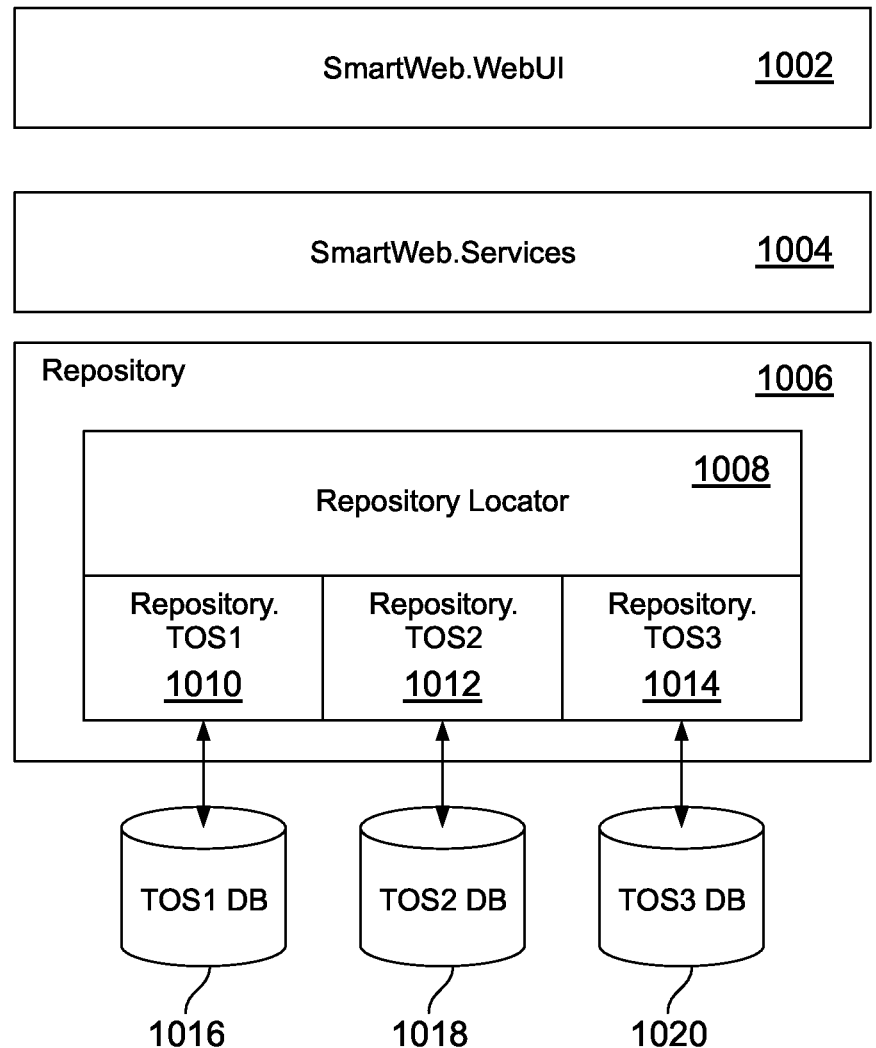
FIG. 10 is an illustration of an exemplary TOS-independent or TOS-agnostic repository locator consistent with one or more aspects of the innovations herein.

FIG. 10 is an illustration involving an exemplary TOS-independent or TOS-agnostic repository locator consistent with one or more aspects of the innovations herein. Referring to the representative diagram of FIG. 10, a services component 1004 of the TOS web portal may be designed to support multi-terminals with different Terminal Operating Systems. To support multi-terminals in a TOS agnostic way, the services component 1004 may include or involve another component or application that performs processing associated with and looks up the repository that provide access to distributed terminal databases 1016, 1018, 1020. Here, for example, such functionality may be accomplished via a repository locator component or device 1008.

According to implementations herein, such repository locator 1008 may centralize distributed repository lookups, provide a centralized point of control, and may act as a cache that eliminates redundant lookups. Again, an exemplary TOS independent repository locator is shown in FIG. 10. Additional technical details of some TOS agnostic innovations are set forth further below and in the included Appendix materials.

System and Process Architecture

The design and architecture of some of the examples of the system disclosed here, enable the present TOS Web Portal implementations 514 to be an add-on to any existing TOS as opposed to being integrated with a single TOS. This approach allows the present innovations and functionality to be incorporated into any existing TOS through a web-service API layer. Interfaces to other TOS's can be accomplished without the need to re-design or re-architect the TOS Web Portal implementations herein.

Figure 11:
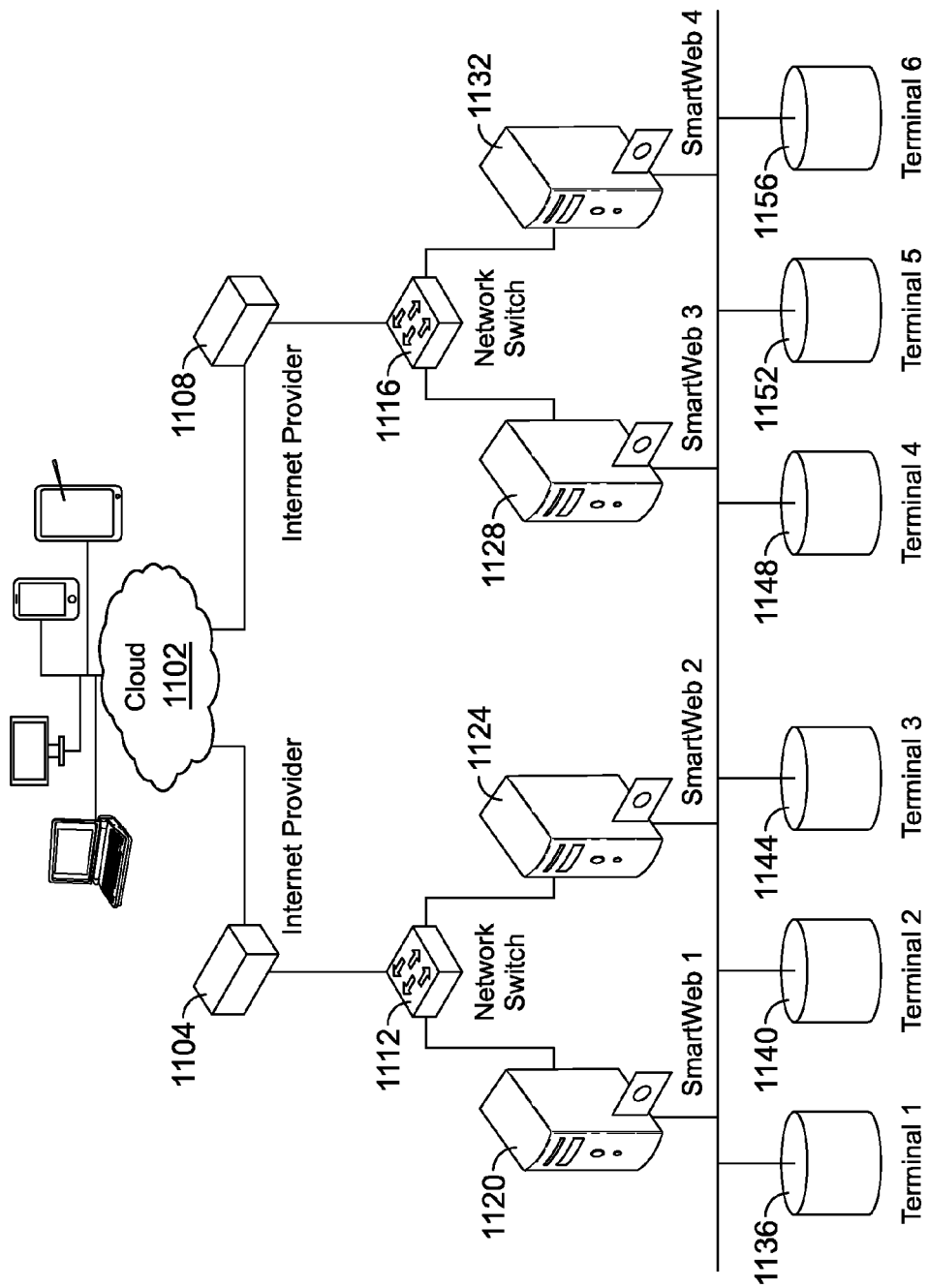
FIG. 11 is a block diagram illustrating exemplary system topology consistent with one or more aspects of the innovations herein.

FIG. 11 is a block diagram illustrating exemplary system topology consistent with one or more aspects of the innovations herein. For instance, multiple instances of the TOS web interface server will be deployed in two physical locations to support multiple terminals. One location has two instances (1120 and 1124) those are connected via Network Switch. Network Switch distributes user requests to balance load in each server instance. Another set of server instances (1128 and 1132) perform in the same way but are located in different physical location to recover problems such as earth quake, power shortage in a certain location, etc. As such, multiple instances of the present TOS Web Portal 1120, 1124, 1128, 1132 may be used to interface with multiple different TOS systems 1136, 1140, 1144, 1148, 1152, 1156, even across multiple internet providers 1104, 1108, all interfacing with a central cloud server 1102.

Object Oriented Programming (OOP)

Systems and methods herein may also be configured using concepts and rules of Object-Oriented Programming. Here, for example, some implementations may utilize objects—data structures consisting of data fields and methods—that are defined along with abstractions of business processes for Terminal Operation. Such implementations utilizing object-oriented features and/or programming may provide many benefits, such as in one or more areas of reusability, extensibility, decoupling, maintainability, and/or reducing complexities, among others.

Reusability.

Some illustrative object-oriented implementations with reusability features may be configured with classes, which can be used by several applications. For example, such systems and methods may define common business model as objects and represent them using classes, such as Container, Vessel, Port, Partner, etc. Illustrative constructs, here, may include configurations such as seen in Insert X1: Reusability Code Example:

X1: Reusability

In the object-oriented approach, we build classes, which can be used by several applications. smartWeb defines common business model as objects and represent them using classes, such as Container, Vessel, Port, Partner, etc.

```
public class Vessel : IEquatable<Vessel>
{
    public string VesselCode { get; set; }
    public string Name { get; set; }
    public string CallYear { get; set; }
    public string CallSequence { get; set; }
    public string VoyageNumber { get; set; }
}
public class Container
{
    public string Number { get; set; }
    public string CombinedCode { get; set; }
    public ContainerType Type { get; set; }
    public ContainerLength Length { get; set; }
    public ContainerHeight Height { get; set; }
}
public abstract class Partner
{
    public PartnerKey Key { get; set; }
    public string ScacOrSscoType { get; set; }
    public string ScacOrSscoCode { get; set; }
    public string EnglishShortName { get; set; }
    public string AgreementNotSigned { get; set; }
    public string InsuranceNotReceived { get; set; }
    public string InsuranceExpired { get; set; }
    public string PerDiemCheck { get; set; }
```

```
public string RepairCheck { get; set; }
public DateTime? EIAStartDate { get; set; }
public DateTime? EIAEndDate { get; set; }
public string CitationCheck { get; set; }
public virtual bool AgreementExists { get; set; }
private bool m_isOnHold;
public virtual bool IsOnHold
{
  get
  {
    return AgreementExists && (AgreementNotSigned = =
    DomainConstants.YES
    ||
      InsuranceNotReceived = = DomainConstants.YES ||
      InsuranceExpired = = DomainConstants.YES ||
      PerDiemCheck = = DomainConstants.YES ||
      RepairCheck = = DomainConstants.YES ||
      CitationCheck = = DomainConstants.YES);
  }
  private set { m_isOnHold = value; }
}
private bool m_isAgreementValid;
public virtual bool IsAgreementValid
{
  get
  {
    return AgreementExists && EIAStartDate.HasValue &&
      EIAEndDate.HasValue &&
      EIAStartDate.Value.Date <= DateTime.Today &&
      EIAEndDate.Value.Date >= DateTime.Today;
  }
  private set { m_isAgreementValid = value; }
}
}
```

Here, such constructs and definitions of objects may be reused throughout the application many times. Furthermore, the same object may be used to extend existing features or add new feature of the application. Accordingly, applications may be modified using working objects and thus code does not need to be written from scratch. Such reuse of objects reduces the effort of recreating them as well as reduces the chances of introducing errors. This not only saves development time but also improves the robustness of such applications.

Further, various OOP's programming functions and modules can be reused. For example, the following, Insert X2: Table Example may be used to call a method in service. The same function may also be used throughout application since the method is defined OOP practices.

X2: Reuse

These definitions of objects are reused throughout the application in many times. Furthermore, the same object is used to extend existing features or add new feature of the application. We modify applications using working objects and do not need to write code from scratch. The reuse of objects reduces the effort of recreating them as well as reduces the chances of introducing errors. This not only saves development time but also improves the robustness of the application. In OOP's programming functions and modules can be reused. The following method is used to call a method in service. The same function is used throughout application since the method is defined OOP practices.

```
public TResponse Call<TRequest, TResponse>(
  TRequest request,
  Func<MainServiceClient, TRequest, TResponse> callOperation,
  Action<string> onFailure = null)
{
  try
  {
    var principal = HttpContext.Current.User as PortsPrincipal;
    using (var contextScope = new
  OperationContextScope(ServiceClient.InnerChannel))
    {
      if (principal != null)
        SetupMessageHeader(principal);
      return callOperation(ServiceClient, request);
    }
  }
  catch (FaultException<ServiceException> ex)
  {
    CLogManager.LogError("faultexception " + ex.Message);
    if (onFailure != null)
      onFailure.Invoke(ex.Message);
    return default(TResponse);
  }
  catch (FaultException ex)
  {
    CLogManager.LogError("faultexception " + ex.Message);
    if (onFailure != null)
      onFailure.Invoke(ex.Message);
    return default(TResponse);
  }
  catch (CommunicationException ex)
  {
    CLogManager.LogError("comunication error");
    CLogManager.LogError(ex);
    CloseService( );
    m_serviceClient = new MainServiceClient( );
    if (onFailure != null)
      onFailure.Invoke(ex.Message);
    return default(TResponse);
  }
  catch (Exception ex)
  {
    if (onFailure != null)
      onFailure.Invoke(ex.Message);
    return default(TResponse);
  }
  finally
  {
    CloseService( );
  }
}
```

Extensibility.

To illustrate such features, see Insert X3 assume Trucker is the salient Partner. Here, then, implementations may define a trucker by inheriting Partner. Via such aspects implementations may eliminate redundant code and extend the use of existing classes.

X3: Extensibility

Trucker is a Partner. Thus, we define a trucker by inheriting Partner. Through this we can eliminate redundant code and extend the use of existing classes.

```
public class Trucker : Partner
{
  public string TruckerCheck {get; set; }
  public bool IsValid
  {
    get
    {
      return IsAgreementValid && !IsOnHold;
    }
  }
  public override bool IsOnHold
  {
    get
    {
```

-continued

```
        return base.IsOnHold || TruckerCheck == DomainConstants.YES;
      }
    }
}
```

Decoupling.

With regard to decoupling, systems and methods may be configured to decouple modules using an interface instead of using the implementation. In some implementations, for example Insert X4, a Repository object may be defined to satisfy interfaces. Such decoupling of interface from implementation enabling the application to be TOS agnostic; illustrative configurations, here, may be structured as follows.

X4: Decoupling

OOP practices in smartWeb decouple modules using an interface instead of using the implementation. For example, Repository object is defined to satisfy interfaces. This decoupling of interface from implementation allows for the application being TOS agnostic.

```
    public override IBookingRepository LocateBookingRepository( )
    public override IBookingOperationRepository LocateBookingOperationRepository( )
    public override ITransshipBookingRepository LocateTransshipBookingRepository( )
    public override IExportContainerRepository LocateExportContainerRepository( )
    public override IBillOfLadingRepository LocateBillOfLadingRepository( )
    public override IContainerRepository LocateContainerRepository( )
    public override IImportDrayInRepository LocateImportDrayInRepository( )
    public override IRailBookingRepository LocateRailBookingRepository( )
    public override IPreStageHazardousRepository LocatePreStageHazardousRepository( )
    public override IBookingNonHazardousRepository LocateBookingNonHazardousRepository( )
```

Maintainability.

Via use of objects and various OOP features herein, functions defined in such implementations may have very simple return values and parameters compared to those in existing systems. The following table show some illustrative examples as seen in Insert X5:

X5: Maintainability

Using objects, functions defined in smartWeb have very simple return values and parameters compared to those in existing webTAMS. Following table show some example.

TABLE 1

| WebTAMS | smartWeb |
|---|---|
| Public Function FetchEquipment( ByVal strEquipment As String, _ ByRef rsReturn As Variant, _ ByRef intContainerStatus As Variant, _ ByRef param0 As Variant, _ ByRef param1 As Variant, _ ByRef param2 As Variant, _ ByRef param3 As Variant, _ ByRef param4 As Variant, _ ByRef param5 As Variant, _ ByRef param6 As Variant, _ ByRef param7 As Variant, _ ByRef param8 As Variant, _ ByRef param9 As Variant, _ ByRef param10 As Variant, _ ByRef param11 As Variant, _ ByRef param14 As Variant, _ ByRef varInOutData As Variant, _ ByRef varAuthSSCO As Variant, _ ByRef varMessage As Variant, _ ByRef pstrPendSvcCode As Variant, _ ByRef pstrPendRemark _ ) As Integer | public EquipmentContainer FindEquipmentContainer (stringequipmentNumber, string ssco, IList<string> associatedSsco) |
| Public Sub FetchInOutData(ByVal strCntr As String, ByVal strVslCd As String, ByVal strCallYr As String, ByVal strCallSeq As String, ByRef varReturn As Variant, varMessage As Variant) | private EquipmentContainer GetInOutData (EquipmentContainer container) |
| Private Function UpdateALL(ByVal pstrTerminal, ByVal strLocalClearValue As Variant, ByVal pstruserid As Variant, _ ByVal strUSDAValue As Variant, ByVal strFreightValue As Variant, _ ByVal pstrDemStatusValue As Variant, ByVal pstrSSCO As Variant, _ ByVal pstrTruckerCode As Variant, ByVal pstrTruckerName As String, _ ByVal pstrOrigTrucker As String, ByVal pstrCustomRmk As String, _ ByVal lngPIN As Variant, strOriginalPIN As Variant, _ ByVal strFreeDays As Variant, ByVal strDemRateCode As Variant, _ ByVal strContNumber As Variant, strMessage As Variant, _ ByVal pstrRights As Variant, ByVal pstrDemDate As Variant, _ ByVal pstrServiceCode As Variant, ByVal pstrBondDest As Variant, _ ByVal pstrCarrierStatus As Variant, ByVal pstrCarrierCategory As Variant, ByVal pstrCarrierRemark As Variant, _ ByVal pstrBlNo As Variant, _ ByVal strVslCd As Variant, ByVal strCallYear As Variant, ByVal strCallSeq As Variant, _ ByVal pstrOverrideTRKCode As Variant, ByVal pstrOverrideTRKName As String, _ ByVal pstrCustomStatus As Variant, Optional ByVal boolUpdateTrk As Boolean = True, _ Optional ByVal boolUpdateOverrideTrk As Boolean = True) As Boolean | public bool Update (ImportContainer container) |
| Private Function ValidateTruckerFully( ByRef pstrSTCTrucker As Variant, ByVal pstrShippingCo As String, _ ByVal pstrTruckerCode As Variant, ByRef pstrTruckerCompany As Variant, ByRef pstrTrucker As Variant, ByRef pstrTruckerName As String, _ strMessage As Variant) As Integer | private bool ValidateTruckerinfo (ImportContainer container) |

Reducing Complexity/Complexities.

Here, such advantages may be achieved in that a given problem in business can be viewed as a collection of difference objects. Each object represents a business entity and has all business properties and processes as properties and methods. This abstraction reduces the complexity of a problem and makes it easy to manage the complexity. For example, Insert X6, EquipmentControlEditModel object abstracts all business properties and processes relevant to managing containers or chassis in terminal.

X6: Reduced Complexity of a Problem

A given problem in business can be viewed as a collection of difference objects. Each object represents a business entity and has all business properties and processes as properties and methods. This abstraction reduces the complexity of a problem and makes it easy to manage the complexity.

For example, EquipmentControlEditModel object abstracts all business properties and processes relevant to managing containers or chassis in terminal.

```
public class EquipmentControlEditModel
{
    public InquiryModel Inquiry { get; set;}
    public MultiInquiryModel MultiInquiry { get; set;}
    public string SteamshipCompany { get; set;}
    public EquipmentState State { get; set;}
    public string InventoryStatus { get; set;}
    public string DamageCondition { get; set;}
    public string Memo { get; set;}
    public string InDate { get; set;}
    public string OutDate { get; set;}
    public string InGatePass { get; set;}
    public string OutGatePass { get; set;}
    public bool HasAction { get; set;}
    public string ActionType { get; set;}
    public string ServiceCodeDescription { get; set;}
    public bool HasPendingAction { get; set;}
    public bool ShowErrorMessage { get; set;}
    public string ErrorMessage { get; set;}
}
```

Figure 12:
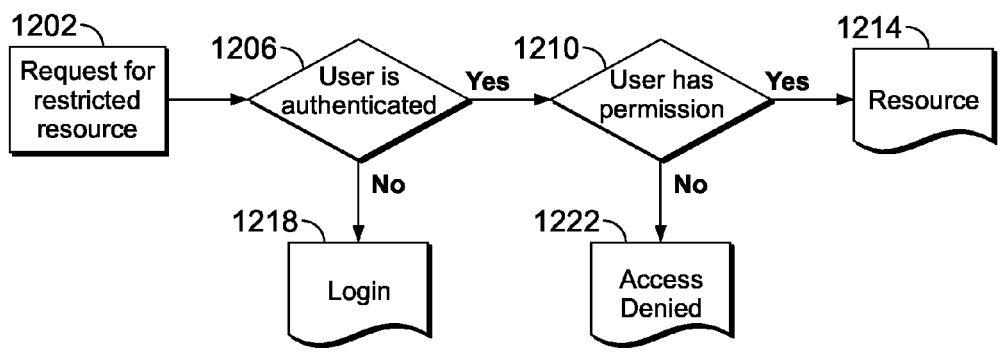
FIG. 12 is an exemplary flow diagram of an illustrative user authentication and authorization process consistent with one or more aspects of the innovations herein.

This modularity makes an object to be maintained independently of other objects. All these objects are independent of each other and are maintained separately. Also it can make modifications in an object without affecting functionalities of other objects Security Embodiments of the present TOS Web Portal systems and methods may have one or more of the following security implementations: authentication to authenticate users; authorization to decide which operations the user may execute and which resources the user may access; confidentiality to help ensure protection of sensitive data disclosure; and integrity to protect from changes, user data transmitted between client and server. FIG. 12 is an exemplary flow diagram of an illustrative user authentication and authorization process consistent with one or more aspects of the innovations herein. Referring to the exemplary processing of FIG. 12, a user submits a request for restricted resource 1202, and the system verifies whether the user is authenticated 1206. If not, the user must login 1218. Once the user is authenticated, the system may verify whether the user has permission 1210, and if so, allows access to the resource 1214, or else denies access 1222.

In certain example implementations of the system and methods, authentication may be found in different methods. Examples of these may be, inter alia, Windows Authentication (user signed into windows), Forms Authentication (using a web page to sign in), Passport Authentication (using Microsoft's Passport, also known as Live Id these days, to authenticate) etc.

Figure 13:
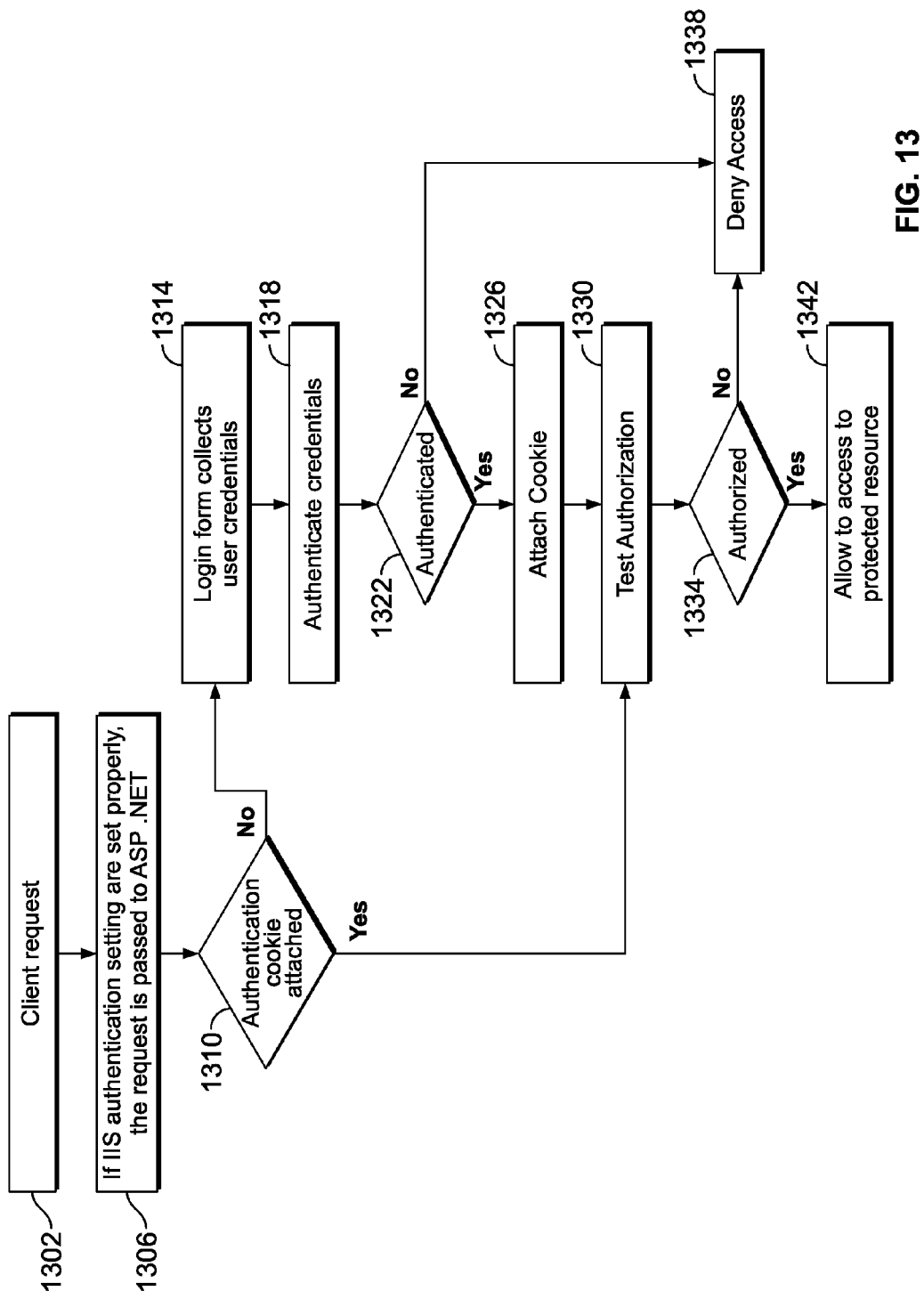
FIG. 13 is an exemplary flow diagram of an illustrative forms authentication and authorization process consistent with one or more aspects of the innovations herein.

Forms Authentication may allow use from the internet and restrict use to approved customers. Further, Forms authentication can be a token-based system. For example, when users log in, they receive a token with basic user information. This information may be stored in an encrypted cookie that is attached to the response so it is automatically submitted on each subsequent request. FIG. 13 is an exemplary flow diagram of an illustrative forms authentication and authorization process consistent with one or more aspects of the innovations herein. An example of this authentication process includes the initial client request 1302, which is passed to ASP.NET provided proper IIS Authentication settings 1306. The system verifies whether user has been assigned an authentication cookie 1310, and if no, the login form 1314 collects user credentials and authenticates the credentials 1318. If the credentials pass the authentication process 1322, then the system attaches a cookie 1326 and tests whether the credentials are authorized for access 1330. If the credentials are either not authenticated 1322 or authorized 1334, the system will deny access 1338. If the credentials are both authenticated 1322 and authorized 1334, the system will allow the user to access the protected resource 1342.

Further, system and methods herein may employ an authorization model. For example, implementations may be configured to use a permission-based security model. Such a model may have pre-defined roles such as those that perform similar functions as "Groups" or "Types" of existing systems. In the present systems, however, implementations may require permissions for each action that needs security validation, such as:

To view or update a page, user needs permission for the action.

To view or update a data/field, user needs permission for the action.

When a user wants to view Import Container list, user should have appropriate permission for the import container list page.

When a user wants to update or save contents in Import Container page, user should have appropriate permission for the import container list page.

According to these implementations, a role may be defined by a set of permissions that are allowed to the owner of the role. Users can have multiple roles and then will have all permissions belong to each role. Such features allow users to have different roles for a steamship company in a site, or have the same role for all steamship companies for the site or one role for all steamship companies and all sites.

Further, implementations may have pre-defined role(s) and custom role(s). Here, for example, pre-defined role examples may include, User Admin, Gate Clerk, Super Admin, SSCO User, Terminal User, And possibly others. Custom Role may allow a user to have customized role (a set of permissions). An admin module of the TOS Web Portal systems herein may provide tool(s) to assign permissions to a user that will be persisted as a new role, such as ABCD-Admin, XYZ-Bob, etc. Further, these custom roles can be reused. In still other implementations involving security, ASP.NET security framework can have a standardized user accounts system that supports all common user account tasks, including registering, managing passwords, and setting personal preferences.

According to additional embodiments herein, there may be three functional areas that may be implemented, including one or more of:

Membership, including registering user accounts and accessing a repository of account details and credentials Roles, including putting users into a set of (possibly overlapping) groups, typically used for authorization Profiles, allowing users to store arbitrary data on a per-user basis It should be noted that ASP.NET provides implementations for each of these three areas, however, present systems may be configured with custom implementation through a system of providers. Here, for example, custom providers may be derived from "built-in" abstract provider classes.

Finally, with respect to some implementations, systems and methods herein involving the present TOS Web Portal features may use SSL (Security Sockets Layer) in all modules.

TOS-Agnostic Details and Aspects

Implementations herein may involve the layered architecture set forth above. A layer refers to a logical separation, such as a introducing a different assembly in the same process space. Layering provides separation of concerns and better factoring of code, which gives us maintainability and scalability. According to various implementations herein, there may be 4 layers in the present TOS Web Portal systems and methods—Presentation, Service, Business Logic and Data Access layers.

Business logics layer/aspects herein may be represented by domain model which is a conceptual model that represents the TOS Web Portal' business domain. A domain model mingles data and process, has multi-valued attributes and a complex web of associations, and may use inheritance. Further, the data access layer is the layer that is solely responsible for talking to the data store and persisting and retrieving business objects. The layer typically includes all the create, read, update and delete methods, transaction management, data concurrency, as well as a querying mechanism to enable the business logic layer to retrieve object for any given criteria.

Different Terminal Operating Systems may use different data persisting technologies and will require different method to access persisted data. It might be an access to relational databases but from different vendors (Oracle, MS Sql, MySql, etc.). Or it might be an access to the end point of WS*—compliant web services. For the system to be TOS agnostic, it is critical how system switches data access method with minimum impact on business logic layer and presentation layer.

Repository-Pattern.

Repository pattern features and functionality herein may be used to make smartWeb application be independent of Terminal Operating System (TOS). Repository separates the logic that retrieves the data and maps it to the entity model from the business logic that acts on the model. The business logic should be agnostic to the type of data that comprises the data source layer. For example, the data source layer can be a database or a Web service.

Further, in some implementations, a backing store for data can be a business service that is exposed by a line-of-business (LOB) application. Services are often expensive to invoke and benefit from caching strategies that are implemented within the repository. In this case, the logic first checks to see if the repository is in the cache. If it is not, the repository instance is created and placed into cache then utilized to retrieve the requested information.

Service Locator Pattern.

Service Locator pattern features and functionality herein may define a component that knows how to retrieve the services an application might need. The caller has no need to specify the concrete type; the caller normally indicates an interface or an abstract type. The Service Locator pattern may hide the complexity of component lookup, handle the caching or pooling of instances and, in general, offer common provisioning for component lookup and creation.

A focus in Service Locator Pattern may be to achieve the lowest possible amount of coupling between components. The locator represents a centralized console that an application uses to obtain all the external dependencies it needs.

As such, present implementations may be designed to support multi-terminals with different Terminal Operating Systems. To support multi-terminals in TOS agnostic way, the TOS web interface application may involve processing to look up the repository that provides access to each of distributed terminal databases.

Repository Initialization

Figure 14A:
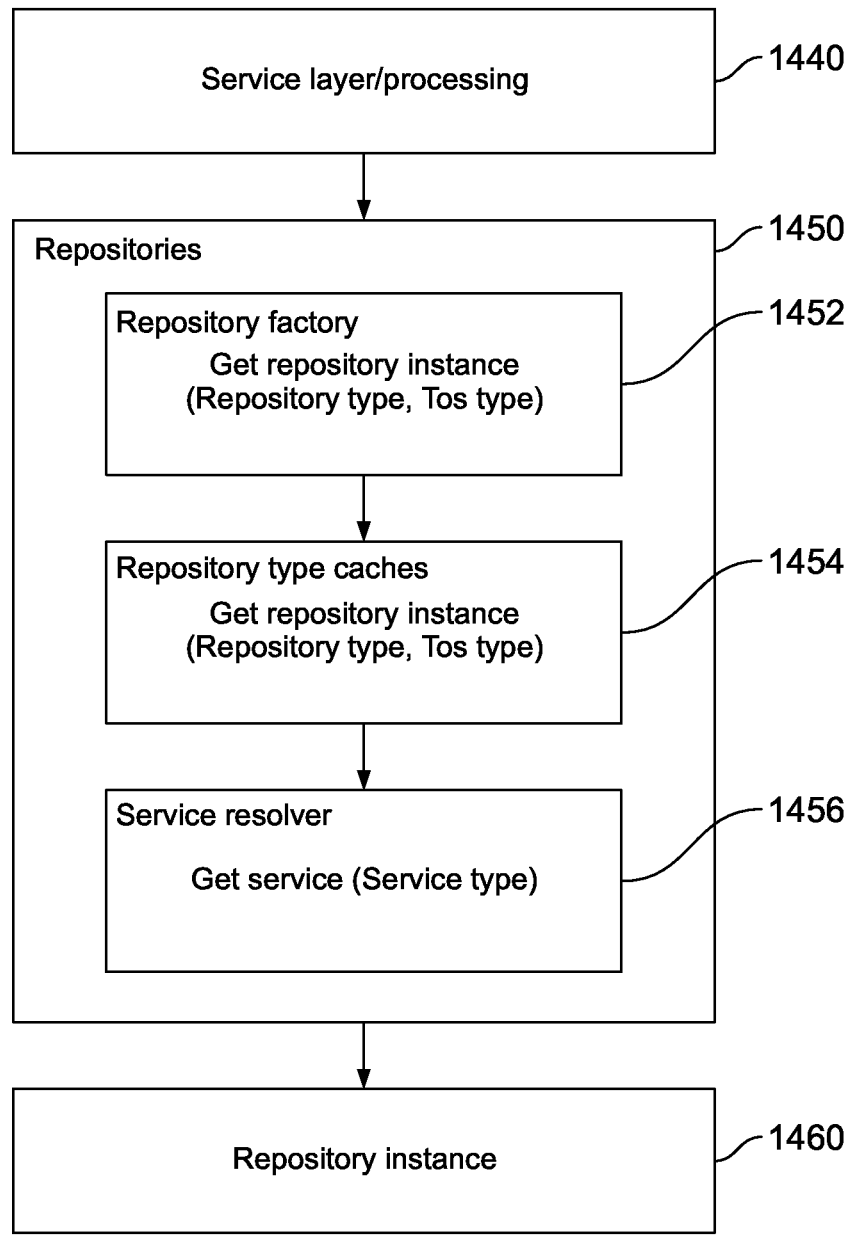
FIGS. 14A and 14B show exemplary flow diagrams involving illustrative repository processing consistent with one or more aspects of the innovations herein.
Figure 14B:
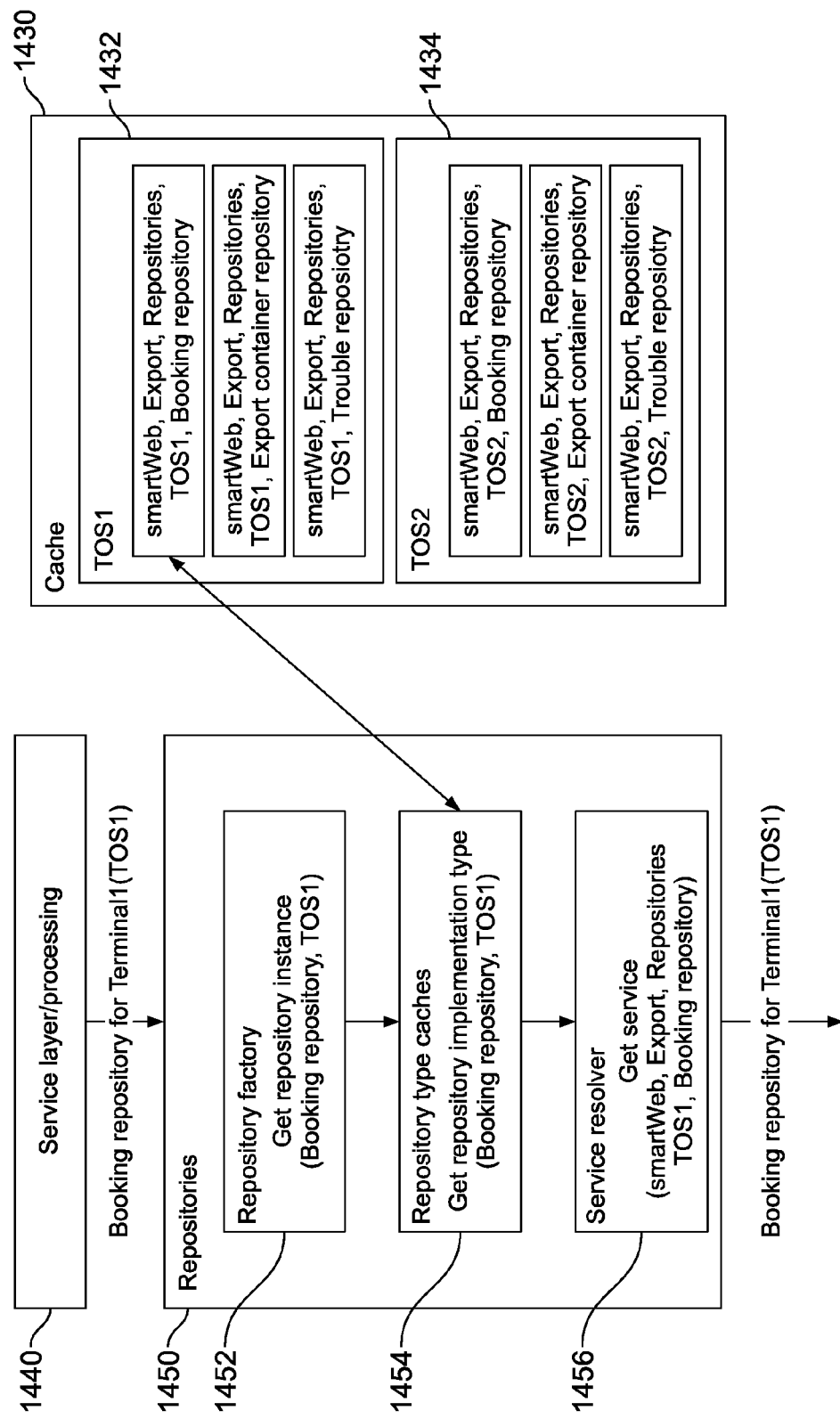

Turning back to overall aspects of the innovations herein, FIGS. 14A and 14B show exemplary flow diagrams involving illustrative repository processing methods consistent with one or more aspects of the innovations herein. FIG. 14B is a specific example illustrating the process outlined in FIG. 14A. Detailed examples of code which may be used by elements of systems performing the described exemplary methods of FIGS. 14A and 14B may be found in Appendix 1, attached hereto.

Turning first to FIG. 14A, in 1440 a processing request may be received via a service module/processing layer. For example, this request may be a request to access and/or manipulate data in a TOS or business object. In response, a repository instance may be created and/or retrieved to facilitate processing of the request. In 1450, the request and/or data associated with the request may be transmitted to a repository module/processing layer. In 1452, a repository factory module/processing layer associated with the repository module/processing layer may process information to determine a repository instance that may be appropriate for processing the request. The repository instance may be specific to a TOS type for a TOS to be accessed and/or a repository type associated with the type of request that was received. In 1454, a repository type cache may be accessed by the repository factory to retrieve a previously generated repository implementation type appropriate for the determined repository instance (e.g., based on the repository type and/or TOS type). For example, the system may have received a similar request to perform similar processing on the same TOS type in the past, and may have generated a repository in response and stored the repository in the cache. Default/commonly encountered repositories may also be stored. In some cases, there may be no appropriate repository in the cache, in which case the system may generate one and store it in the cache for future use. A relationship between the cached data and the TOS type may be determined by using a reflection operation, a helper attribute, a convention, and/or in some other way. For example, the reflection operation may be used to discover a TOS type that is configured to implement interfaces configured with an inversion of control container; is contained in a namespace of interest; and/or comprises a TOS type attribute of interest and/or is contained in a sub-namespace named after a TOS type of interest.

In 1456, a service resolver module/processing layer may instantiate the retrieved/generated repository, for example by resolving a service associated with the cached attribute data. In 1460, the repository instance may be delivered. For example, the instance may be provided to the user who made the initial request for interaction.

In one specific example shown for purpose of illustration not limitation in FIG. 14B, the service module/processing layer may send a request for a booking repository for a first terminal (Terminal 1) to the repository module/processing layer. As shown, Terminal 1 may use a first TOS type (TOS 1). In 1452, the repository factory module/processing layer may get a repository instance based on the booking repository type and the TOS 1 type. In 1454, the cache may be searched for the appropriate implementation. In this example, a subset of the cache 1430 contains booking repository instances for a TOS 1 type TOS 1432 and a TOS 2 type TOS 1434. Because the booking repository being requested is for TOS 1, the TOS 1 entry 1432 may be selected. In 1456, the service resolver module/processing layer may use data retrieved from the cache to instantiate the repository, and the appropriate booking repository may be sent to a desired recipient.

Figure 14C:
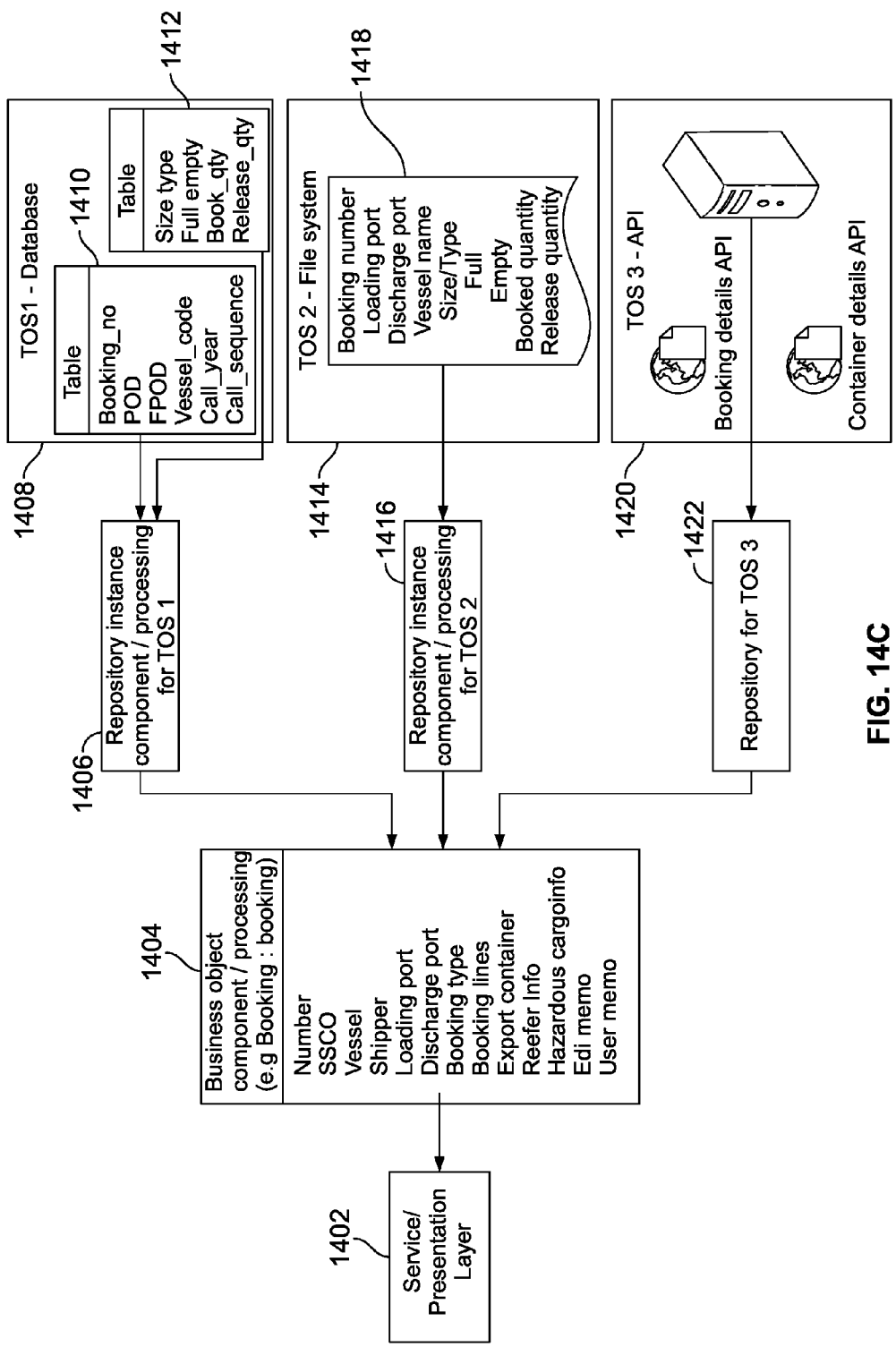
FIG. 14C shows an exemplary sequence diagram involving an illustrative business object processing consistent with one or more aspects of the innovations herein.

FIG. 14C shows an exemplary sequence diagram involving an illustrative booking process and TOS agnostic processing consistent with one or more aspects of the innovations herein. FIG. 14C is a specific example illustrating the process outlined in FIG. 14D. Detailed examples of code which may be used by elements of systems performing the described exemplary methods of FIGS. 14C and 14D may be found in Appendix 2, attached hereto.

A TOS 1 database 1408 is read for booking data 1410 and corresponding container data 1412 that are provided in tables in a TOS 1 specific format. The data 1410 and 1412 are read and transmitted over a network to TOS 1 repository instance component/processing 1406. A similar process occurs for each of TOS 2 repository instance component/processing 1416 and TOS 3 repository instance component/processing 1422. The TOS 2 data source 1414 stored in includes a file system where booking/container data 1418 are stored in database 1414 in a TOS 2 specific format different from the TOS 1 format and TOS 3 format. Once read and transmitted to the TOS 2 repository instance component/processing 1416. The TOS 3 data source is an API where booking detail API and corresponding container detail API data are read and transmitted to the TOS 3 repository instance component/processing in a TOS 3 specific format. In FIG. 14C, each repository instance component/processing corresponds to the booking business object and one of three TOS types. The booking business object has a plurality of associated functions and properties, such as a booking number, steamship company, vessel, shipper, loading port, discharge port, booking type, booking lines, export container, reefer info, hazardous cargo info, EDI memo, user memo, and the like. These properties may have a one-to-one correspondence to the data stored in the TOS databases 1412, 1418 and 1420, or may have a one-to-many correspondence.

Each TOS repository instance component/processing 1406, 1416 and 1422 performs processing to process/transform the data of a TOS specific format retrieved from a corresponding database into the business object format that is a TOS agnostic format. In FIG. 14C, the transformation/mapping process occurs from the TOS specific format to the business object format, but may also be performed from the business object format to the TOS specific format as well. The retrieved data that is converted into the TOS agnostic business object format is transmitted from any of the TOS repository instance component/processing 1406, 1416, 1422 to the business object component/processing 1404. The business object component/processing 1404 performs processing on the business object data according to the user input. The result is output to the service/presentation layer 1402 for further processing and/or display to a user interface.

Figure 14D:
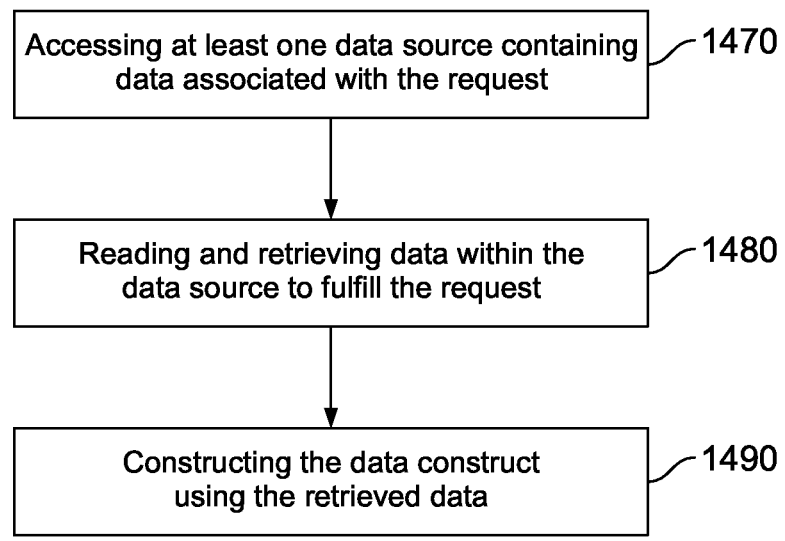
FIG. 14D shows another exemplary flow chart involving illustrative business object processing consistent with one or more aspects of the innovations herein.

FIG. 14D shows an exemplary flow chart involving illustrative repository based TOS agnostic processing consistent with one or more aspects of the innovations herein. The process begins at step 1470 with accessing at least one data source containing data associated with the request. Next, data is read and retrieved within the data source to fulfill the request at step 1480. Then, the data construct is constructed at step 1490 using the retrieved data from step 1480.

Processing User Request in TOS Agnostic

Figure 15:
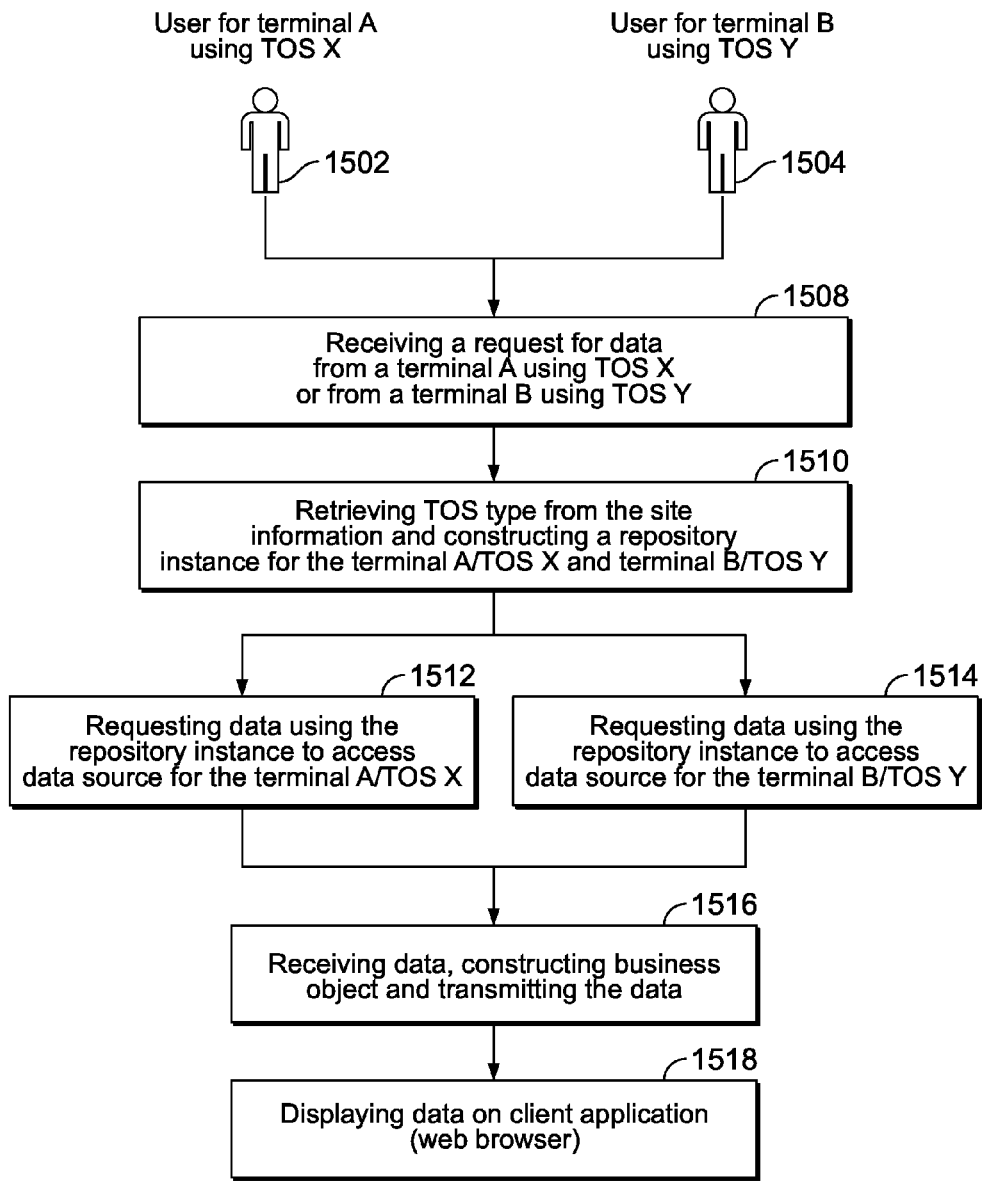
FIG. 15 shows an exemplary flow of processing performed via an illustrative TOS agnostic system and associated processing consistent with one or more aspects of the innovations herein.

FIG. 15 shows an exemplary flow of processing performed via an illustrative TOS agnostic system and associated processing consistent with one or more aspects of the innovations herein. The inventive systems and methods are not limited to a user of a specific Terminal Operating System and terminal. Instead, the TOS agnostic system allows a plurality of users to access a plurality of terminals operating under any of a plurality of Terminal Operating Systems. Referring to FIG. 15, users 1502 and 1504 represent different users accessing a plurality of terminal sites operating under different Terminal Operating Systems. For example, user 1502 desiring access to a Terminal A site that implements a TOS X while user 1504 desires access to a Terminal B that implements a TOS Y, where the TOS X and TOS Y are incompatible with each other. In particular, each Terminal Operating System operates based on a proprietary language and/or data format. The same information stored by one TOS database may be described so as to be unrecognizable and unusable to a different TOS database.

Conventionally, a user who wishes to access data of terminal sites using different Terminal Operating Systems would need to access an interface specific to the Terminal Operating System of that terminal site. However, consistent with aspects of the present innovations, requests for data are processed regardless of the Terminal Operating System used such that each user 1502, 1504 is able to access any desired terminal site. At step 1508, a request for data is received for any or both Terminal A and Terminal B by the TOS agnostic system. For example, a user interface provides a list of terminals for a user to select. At step 1510, a TOS type is determined based on the request. The system may determine correspondence between a selected terminal and the TOS associated with the terminal. Based on the determined TOS type, a repository instance is constructed for the Terminal requesting data. The construction of the repository instance is discussed in greater detail below in FIG. 17A-17B. Next, one of steps 1512 and 1514 are executed based on the Terminal making the data request. Step 1512 requests data using the repository instance created to access data source for the Terminal A using the Terminal Operating System X. Likewise, step 1514 requests data using the repository instance created to access data source for the Terminal B using the Terminal Operating System Y. At step 1516, data is received to the repository instance, whereby the data is then processed to construct business object data. The retrieved data from a TOS database is converted into a common data format in order to provide a common business object data format. The business object data are then transmitted to the user making the data request. At step 1518, the system displays the business object data to the user via a client application such as a web browser or other user interface. In this manner, a user is able to retrieve data from any Terminal operating any Terminal Operating System from a TOS agnostic system.

Figure 16:
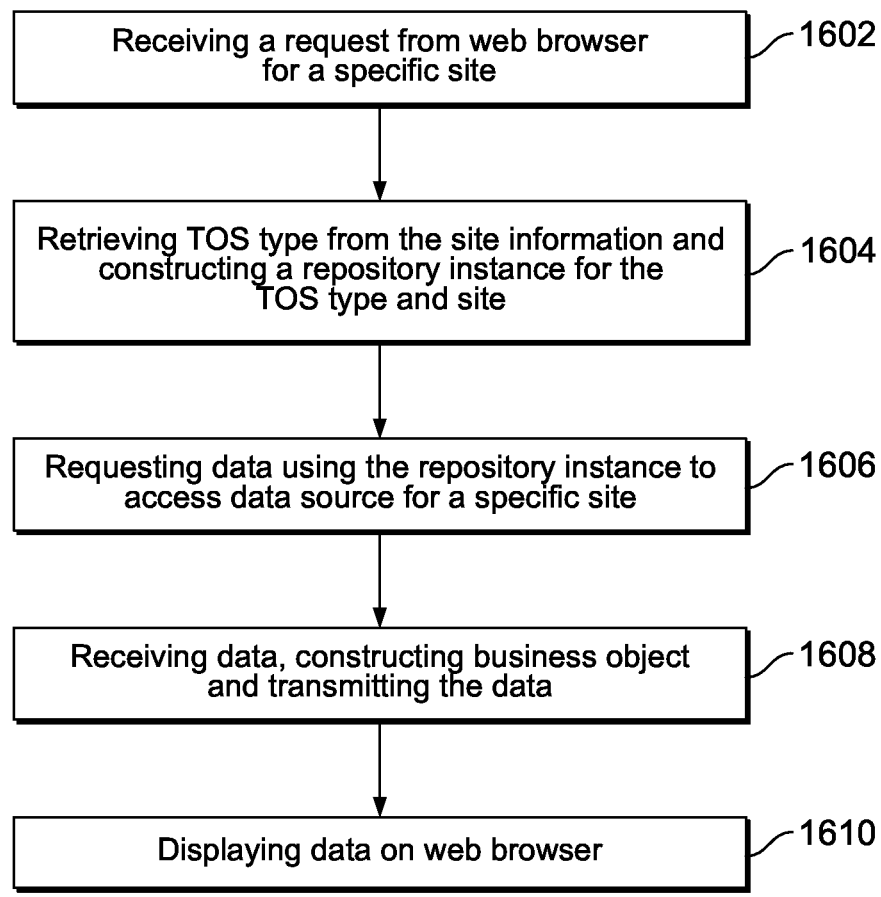
FIG. 16 shows an exemplary work flow diagram of illustrative TOS agnostic processing consistent with one or more aspects of the innovations herein.

FIG. 16 shows an exemplary work flow diagram of illustrative TOS agnostic processing consistent with one or more aspects of the innovations herein. At step 1602, a request is received from a user interface such as a web browser for a specific terminal site among a plurality of terminal sites. At step 1604, a TOS type is determined from the terminal site information. Based on the determined TOS type, a repository instance is constructed within the TOS agnostic system specific to the TOS type and terminal site.

At step 1606, the TOS agnostic system requests data from the terminal site to store in the repository instance. Next, the requested data is received at step 1608 and is processed by the TOS agnostic system to create a set of business objects. The business objects are then transmitted to the user interface and are displayed at step 1610.

Repository Locator

Figure 17A:
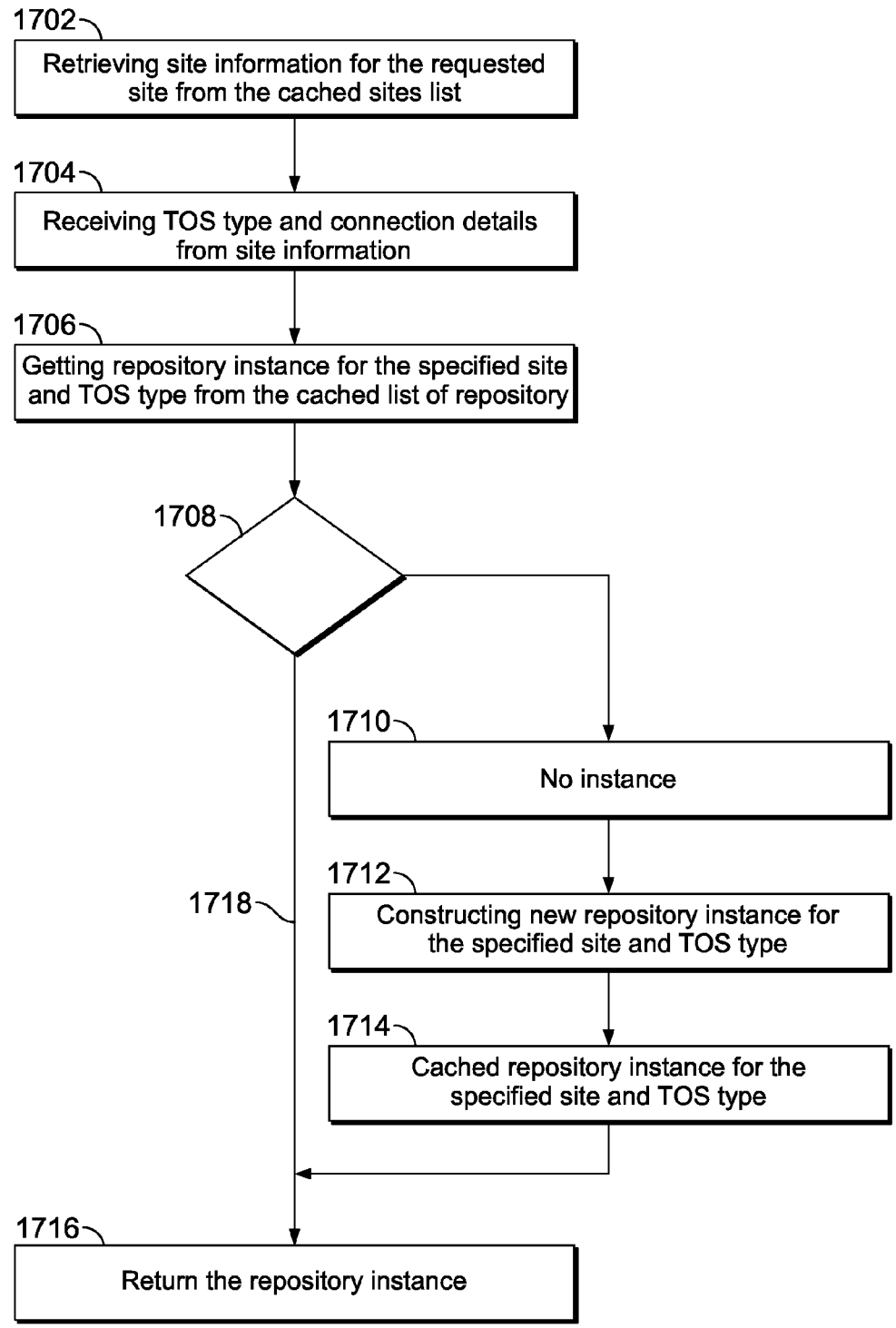
FIG. 17A shows an exemplary flow diagram of illustrative TOS agnostic repository locator processing consistent with one or more aspects of the innovations herein.

FIG. 17A shows an exemplary flow diagram of illustrative TOS agnostic repository locator processing consistent with one or more aspects of the innovations herein. At step 1702, terminal site information is retrieved for a requested terminal site based on a cached list of terminal sites. At step 1704, based on the retrieved terminal site, a Terminal Operating System type corresponding to the terminal site is determined and connection information is retrieved from terminal site information. Next, step 1706 attempts to obtain a repository instance for the specified terminal site and corresponding TOS type from a cached list of repository instances. At the decision step 1708, if it is determined that the TOS agnostic system has previously constructed a repository instance for the requested terminal and TOS type, then the cached repository instance is returned at step 1716. However, if it is determined that no repository instance exists for the specified terminal and TOS type, then a new repository instance is constructed for the specified terminal and TOS type. Once created, the repository instance is cached at step 1714 and returned to the user at step 1716.

Figure 17B:
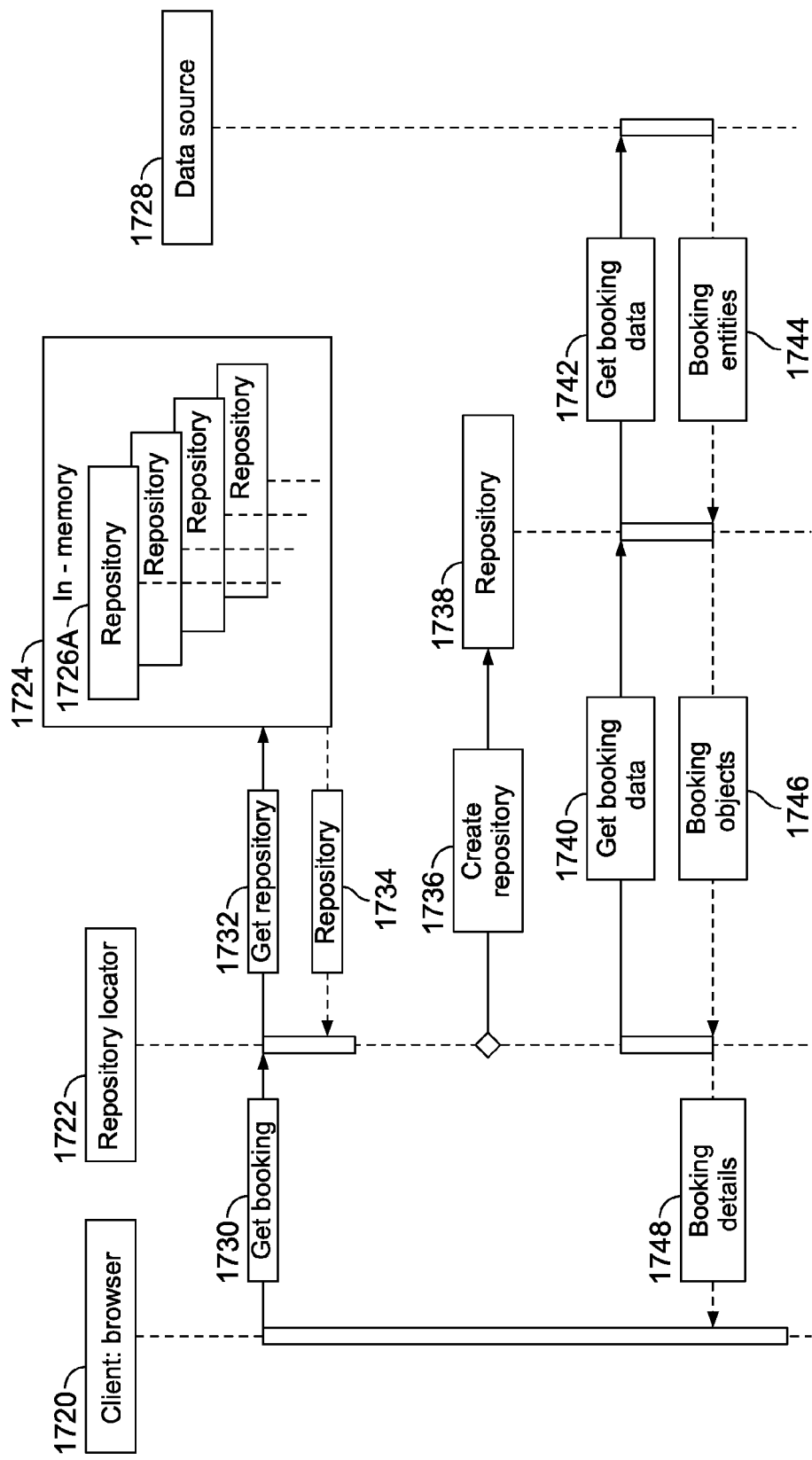
FIG. 17B shows an exemplary sequence diagram involving an illustrative booking process and TOS agnostic processing consistent with one or more aspects of the innovations herein.

FIG. 17B shows an exemplary sequence diagram involving an illustrative booking process and TOS agnostic processing consistent with one or more aspects of the innovations herein. A user 1720 operates a client/browser to input a request 1730 for TOS data, which in this case refers to booking data request 1730. The repository locator 1722 receives this request and first attempts to locate a stored repository 1724 from among a plurality of repository instances 1726 that corresponds to the booking request. If a match is found, then the corresponding booking repository is returned to the repository locator 1722 at step 1734, and the requested booking details 1748 from the located repository 1726A are returned to the browser 1720 and output to a user.

However, if no repository instance is located that corresponds to the booking request 1730, then a create repository function 1736 is called to generate a booking repository 1738. Once created, the repository locator 1722 calls a get booking data 1740 function to the repository 1738 to retrieve the requested booking data from the data source 1728. The repository 1738 then calls a get booking data 1742 function to the data source 1728 to obtain the requested booking information. In response, the data source 1728 returns booking entities 1744 in a format of the data source to the repository 1738. The repository 1738 then performs processing on the booking entities 1744 to map/convert/transform them into booking business objects 1746 in a data source agnostic format.

The booking objects 1746 are then transmitted from the repository 1738 to the repository locator 1722 which may process the booking objects 1746 into booking details 1748. The repository locator 1722 then transmits the booking details 1748 to the browser 1720 in response to the booking request 1730. In this system, the browser needs not be compatible with the operating system or data format of the data source 1728 in order to request and receive information from the data source 1728 since the booking entities 1744 are processed into booking objects 1746 that are data source agnostic.

Figure 20:
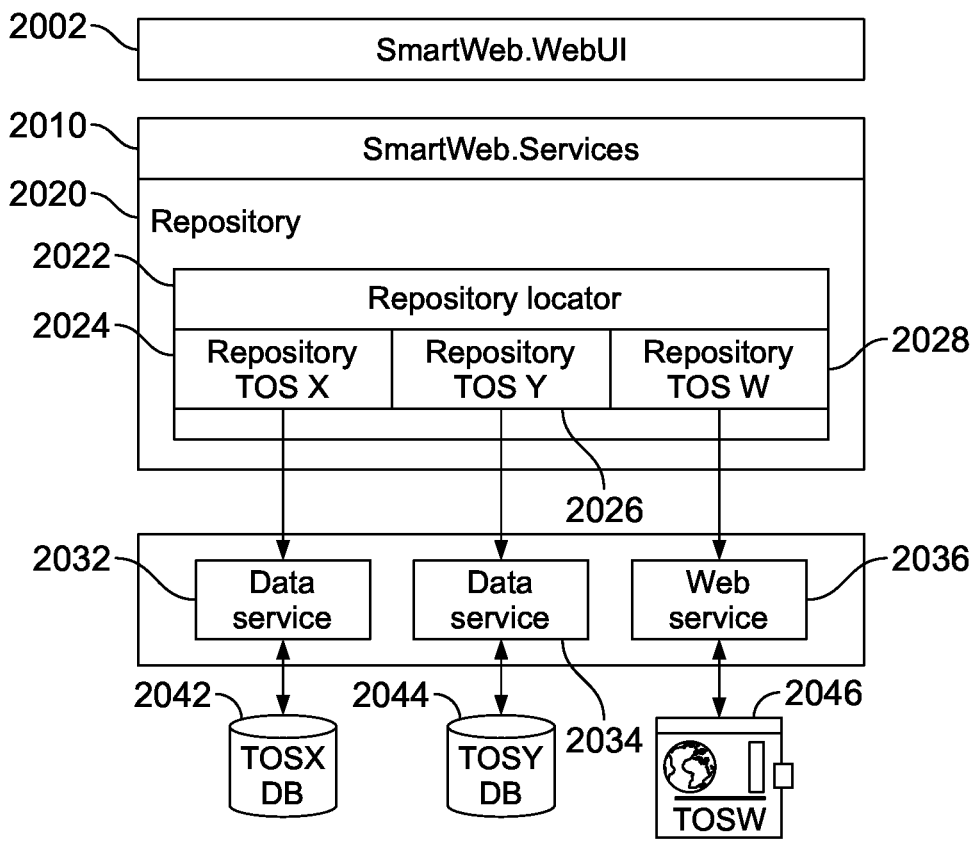
FIG. 20 is a block diagram depicting an illustrative repository locator hierarchy/structure for an exemplary TOS agnostic system consistent with one or more aspects of the innovations herein.

FIG. 20 is a block diagram depicting an illustrative repository locator hierarchy/structure for an exemplary TOS agnostic system consistent with one or more aspects of the innovations herein. A web interface 2002 displays the retrieved database data to the requesting user. The services layer 2010 processes and stores the retrieved data via a repository 2020. The cached repositories retrieve data through the use of respective data services 2032, 2034 and web service 2036. For example, the data service 2032 interfaces with the TOS1 DB for storage into repository 2024. The web service 2036 may similarly retrieve requested data from a web source 2046 for caching in repository 2028.

Layer Architecture of TOS Agnostic System

Figure 18:
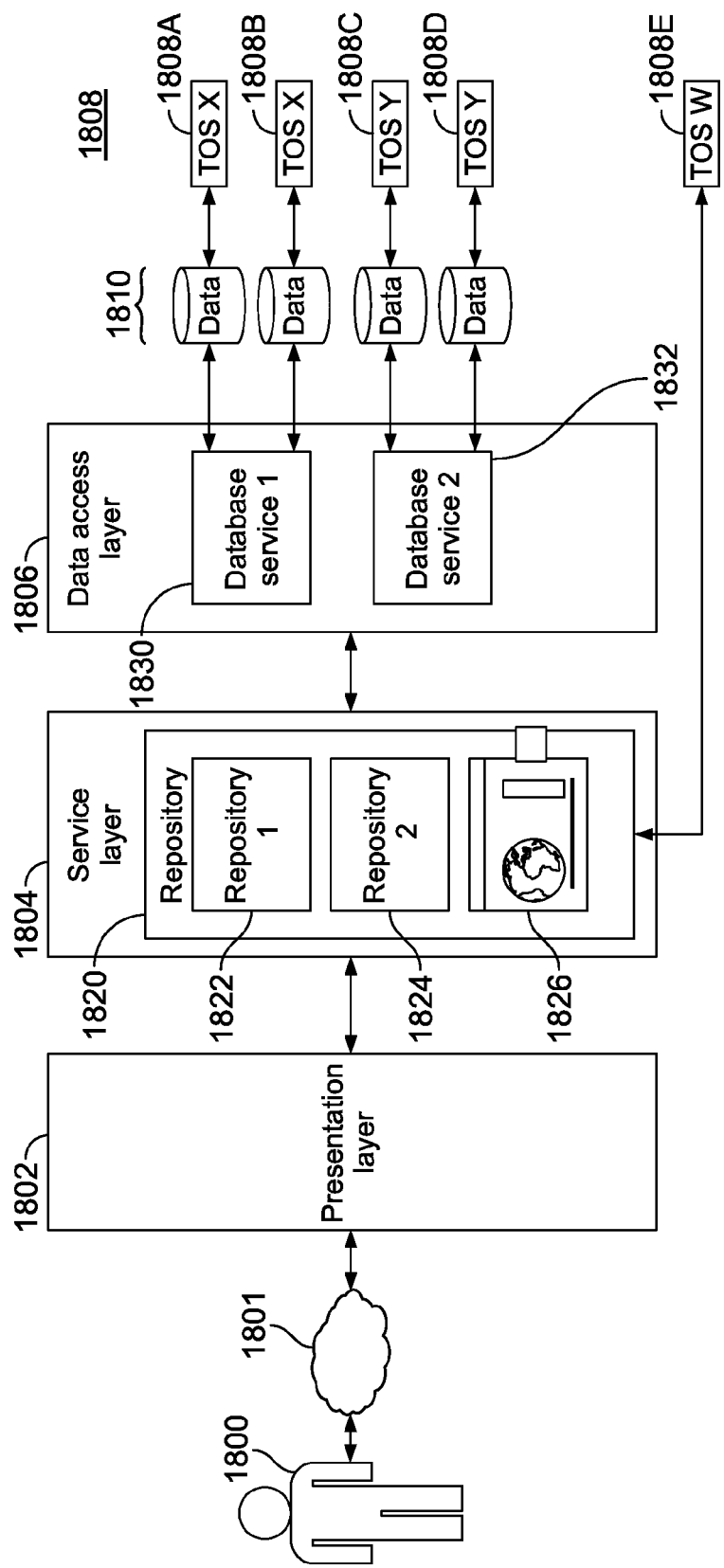
FIG. 18 is a block diagram depicting one illustrative layer architecture for an exemplary TOS agnostic system consistent with one or more aspects of the innovations herein.

FIG. 18 is a block diagram depicting one illustrative layer architecture for an exemplary TOS agnostic system consistent with one or more aspects of the innovations herein. A user 1800 operates a computing device that connects to a network 1801 to view a presentation layer. The presentation layer 1802 receives data from a service layer 1804 that stores and processes terminal data from a plurality of TOS types. The service layer 1804 includes a repository 1820 including a plurality of repository instances 1822, 1824, 1826, etc. The repository instances connected to plurality of data sources 1810 operating under different Terminal Operating Systems 1808. The data access layer 1830 obtains the requested terminal data from any of a plurality of databases 1810 via corresponding database services 1830, 1832. A database service is provided for each TOS type such that each database corresponding to TOS X is accessible by database service 1830. Similarly, each database corresponding to TOS Y is accessible by database service 1832.

Figure 19:
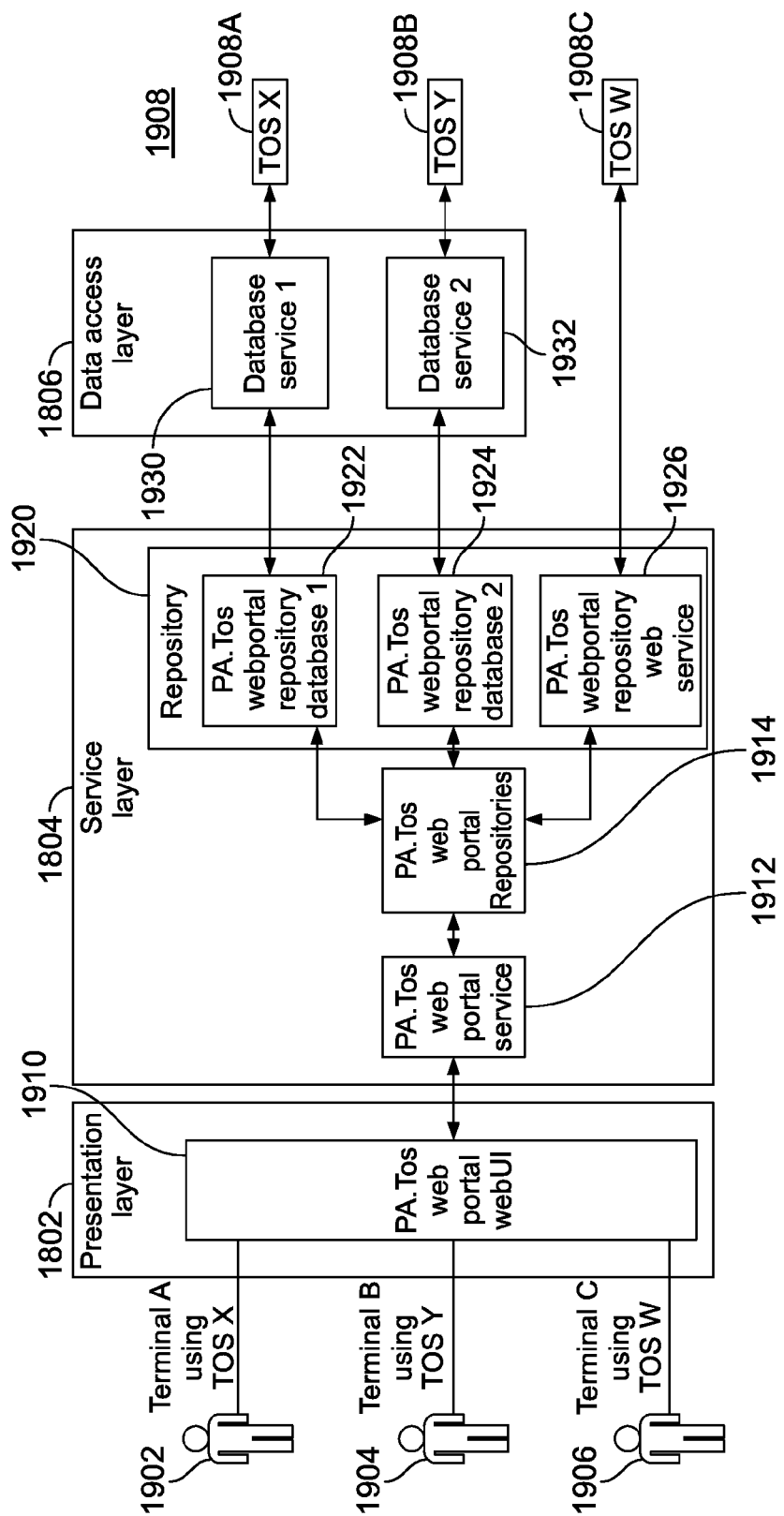
FIG. 19 is a block diagram depicting illustrative layer architecture and associated processing modules for an exemplary TOS agnostic system consistent with one or more aspects of the innovations herein.

FIG. 19 is a block diagram depicts an illustrative layer architecture and associated processing modules for an exemplary TOS agnostic system consistent with one or more aspects of the innovations herein. In FIG. 19, each user 1902, 1904 and 1906 inputs a request to the presentation layer 1802 to access data from different terminal using different Terminal Operating Systems. Description of elements already described are omitted for brevity.

PA.Tos.smartWeb.WebUI at step 1910 represents a server component has been built based on MS ASP.NET MVC framework. This component is designed Model-View-Controller (MVC) design pattern and responsible to receive and process user request, and construct and send response to user. Next, PA.Tos.smartWeb.Service 1912 is a service component that receives user requests from the Controller in PA.Tos.smartWeb.WebUI component. The service component calls methods in repositories to process user requests. It retrieves data from repository, sends data to repository to update data source, process business logic, and constructs response and returns to Controller in PA.Tos.smartWeb.WebUI component. PA.Tos.smartWeb.Repositories 1914 is a server component that implements Repository Locator which instantiates Repository instance for a terminal and TOS type depending on the user request.

PA.Tos.smartWeb.Repository.Database2 1924 is a Repository instance for a specific database of a TOS. The Repository instance knows type of the database, how to communicate with the database, where is the database, etc. Repository instance constructs business entities from data specific to TOS type or convert any information in business entities to data be used in TOS specific database.

PA.Tos.smartWeb.Repository.WebService 1926 is a Repository instance used to retrieve or send data to TOS data source using Web Service. The Repository instance knows type of web service, service contract, data contract, operation contract, how to communicate, where is the service access, etc. Repository instance constructs business entities from data specific to TOS type or convert any information in business entities to data be used in TOS specific data source.

TOS Agnostic Processing

Figure 21:
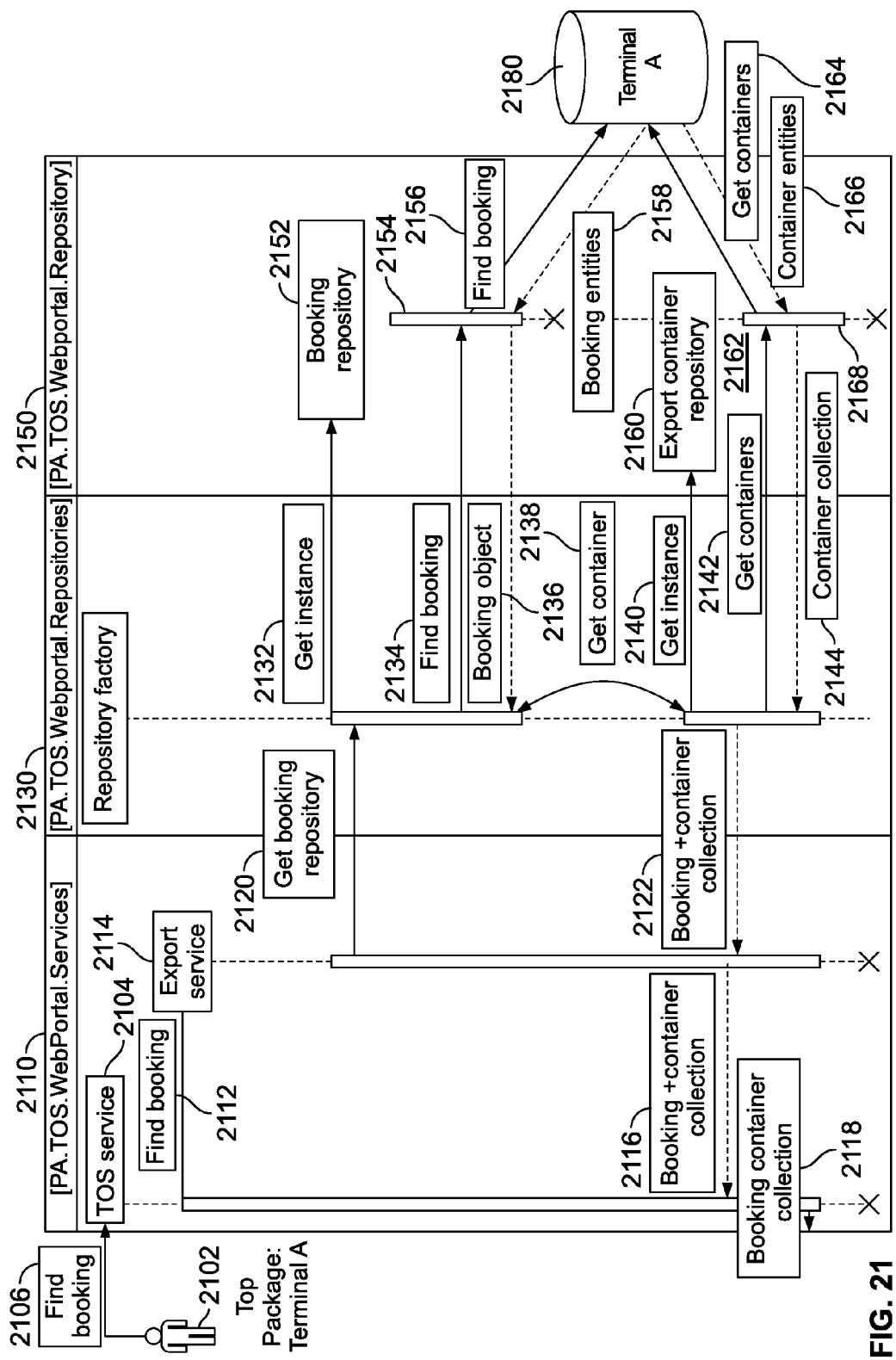
FIG. 21 shows an exemplary sequence diagram involving an illustrative booking process and TOS agnostic processing consistent with one or more aspects of the innovations herein.

FIG. 21 shows an exemplary sequence diagram involving an illustrative booking process and TOS agnostic processing consistent with one or more aspects of the innovations herein. Referring to FIG. 21, illustrative processing may begin at step 2106 where a user logs into a Terminal A via a web-based user interface and inputs a request for booking information for the Terminal A database. For example, a user may request information for a booking number BK123456. Next, the TOS Agnostic service 2104 receives and processes the user request for the booking information. The service 2104 calls a FindBooking method 2112 in export service 2114. The export service 2114 implements methods related to export business processes. The FindBooking method 2112 is processed by booking repository 2152. The export service 2114 first requests a booking repository instance from the repository factory 2130 using the GetBookingRepository method. The repository factory 2130 is a repository locator that returns the repository instance for Terminal A. The repository factory 2130 requests a booking repository for Terminal A using the GetInstance method. The booking repository 2152 retrieves and stores the booking information for Terminal A from a Terminal A database.

Next, the FindBooking method 2134 is defined in the export service 2114 to call the FindBooking method 2156 of the booking repository 2152 to request the booking information corresponding to booking number BK123456 of Terminal A. FindBooking method 2156 accesses the Terminal A database and obtains the requested booking information from the Terminal A database as booking entities 2158. The booking entities 2158 are then stored in the booking repository 2152 as booking objects 2136. For instance, the booking entities 2158 retrieved from the Terminal A as raw data that are converted/translated into a booking business object 2136. The booking objects 2136 are then returned to the export service 2114.

Further, GetContainer 2138 is an internal method call to retrieve container information related to the requested booking. Similar to the GetBookingRepository method, the export service 2114 executes a GetContainer method 2142 to the repository factory 2130 to obtain container information corresponding to the booking information requested by the user. GetInstance method 2140 requests a container repository 2160 instance for the Terminal A. The GetContainers method 2142 implemented by the export service 2114 requests the container data related to the booking information from the container repository 2160. The container repository 2160 retrieves data related to export containers corresponding to the booking number from the Terminal A database using the GetContainers method 2146. In response, the Terminal A database transmits the requested data as container entities 2166. The booking entities 2158 and container entities 2166 are provided in the format of the Terminal A operating system incompatible with the format of other Terminal Operating Systems. Therefore, the container repository 2160 converts/translates the raw container data 2166 of the Terminal A into a container object 2144 to be added to the container repository 2160. Once the booking object 2136 and corresponding container object 2144 are returned to the export service 2114, then the booking and container objects collection 2116 are returned to the TOS Agnostic service 2104. The TOS Agnostic service 2104 processes the business object data 2116 and displays booking and container objects 2118 to the user via a web-based user interface.

Additional Services/Service Layer Aspects

In addition to the basic architectural features set forth above, the service layer may serve as a baseline for integration for/between various illustrative components that may be associated with the TOS interfaces/Terminal Operating Systems herein, e.g., other web applications and Terminal Operating Systems like M21, with respect to which various implementations herein may communicate. Here, for example, the present disclosure and Appendices herein shows how various functionality and information is passed and processed between web applications and a TOS (e.g., M21) via or throughout the service layer. For example, computer program code associated with M21 helping illustrate such features is contained in the "TOS Data Access Library" of the attached compact disc.

With regard to Equipment Interchange Report (EIR) features, generating EIR is data and business logic-intensive process. Many data are collected from one or more TOS databases, such as an M21 database, and archived database(s). Those data are manipulated in various process and applied business logic to be presented in printed format. Further, gate-activity modules in disparate systems or web applications may implement such processes and maintain them separately. In some implementations, ReportService functionality may be utilized to provide with all data for EIR to be used for presentation but hide details of business logic and data access processes. This improves the maintainability and extensibility of the application.

Implementations and Other Nuances

The innovations herein may be implemented via one or more components, systems, servers, appliances, other subcomponents, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on a server, such a server may include or involve components such as CPU, RAM, etc., such as those found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and other media. Computer readable media herein, however, does not encompass/include transitory medi. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data constituting the functionality herein, embodied in some non-transitory format. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission. Also, the modules can be implemented as hardware logic circuitry implementing the functions encompassed by the innovations herein. Finally, the modules can be implemented using special purpose instructions (SIMD instructions), field programmable logic arrays or mixtures of those or other suitable elements which provide the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though computer readable media herein does not encompass/include transitory media.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the inventions have been specifically described herein, it will be apparent to those skilled in the art to which the inventions pertains that variations and modifications of the various implementations shown and described herein may be made without departing from the spirit and scope of the inventions. Accordingly, it is intended that the inventions be limited only to the extent required by the applicable rules of law.

The invention claimed is:

1. A method for processing information involving terminal operating systems, the method comprising:
   constructing a first repository instance for a first TOS type, the constructing comprising selecting a first instance type from a plurality of instance types and resolving an appropriate service for the first instance type, wherein each of the plurality of instance types corresponds to one of a plurality of TOS types;
   requesting first data using the first repository instance to access a data source for a specific site, the first data having a first TOS-specific format corresponding to the first TOS type;
   constructing a first business object using the first data;
   generating, as a function of the first business object, TOS-agnostic second data through processing of the first data;
   determining a second TOS type based on the second data;
   constructing a second repository instance for the second TOS type, the constructing comprising selecting a second instance type from the plurality of instance types and resolving an appropriate service for the second instance type;
   processing the second data into formatted second data having a second TOS-specific format corresponding to the second TOS type; and
   transmitting the formatted second data to a terminal of the second TOS type.

2. The method of claim 1, wherein selecting the first instance type comprises determining a repository type based on the first TOS type.

3. The method of claim 2, wherein determining the repository type based on the first TOS type comprises identifying a repository type related to the first TOS type in a repository type cache.

4. The method of claim 3, wherein identifying the repository type related to the first TOS type comprises using at least one of a reflection operation, a helper attribute, and/or a convention to determine a relationship between the repository type and the first TOS type.

5. The method of claim 4, wherein using the reflection operation comprises discovering a TOS type that:
   is configured to implement interfaces configured with an inversion of control container;
   is contained in a namespace of interest; and/or
   comprises a TOS type attribute of interest and/or is contained in a sub-namespace named after a TOS type of interest.

6. The method of claim 1, further comprising receiving a request for the first data from a terminal.

7. The method of claim 6, wherein constructing the first repository instance is performed in response to receiving the request for the first data from the terminal.

8. The method of claim 1, further comprising storing the first repository instance in a memory.

9. The method of claim 8, further comprising fulfilling a request for third data having the first TOS-specific format, the fulfilling comprising retrieving the stored first repository instance and requesting the third data using the first repository instance.

10. The method of claim 1, further comprising storing the second repository instance in a memory.

11. The method of claim 10, further comprising fulfilling a request for fourth data having the second TOS-specific format, the fulfilling comprising retrieving the stored second repository instance and requesting the fourth data using the second repository instance.

12. The method of claim 1, further comprising displaying the second data.

13. The method of claim 1, wherein generating the second data comprises processing the first data into a TOS-agnostic format and performing additional processing on the first data.

14. The method of claim 1, wherein the first TOS type and the second TOS type are the same.

15. A system for processing information involving terminal operating systems, the method comprising:
   a repository factory processor configured to construct a first repository instance for a first TOS type, the constructing comprising selecting a first instance type from a plurality of instance types and resolving an appropriate service for the first instance type, wherein each of the plurality of instance types corresponds to one of a plurality of TOS types;
   a service layer processor configured to request first data using the first repository instance to access a data source for a specific site, the first data having a first TOS-specific format corresponding to the first TOS type;
   a business logic processor configured to:
      construct a first business object using the first data; and
      generate, as a function of the first business object, TOS-agnostic second data through processing of the first data;
   wherein the repository factory processor is further configured to:
      determine a second TOS type based on the second data; and
      construct a second repository instance for the second TOS type, the constructing comprising selecting a second instance type from the plurality of instance types and resolving an appropriate service for the second instance type;
   wherein the business logic processor is further configured to process the second data into formatted second data having a second TOS-specific format corresponding to the second TOS type; and
   wherein the service layer processor is further configured to transmit the formatted second data to a terminal of the second TOS type.

16. The system of claim 15, further comprising a presentation layer processor configured to receive a request for the first data from a terminal.

17. The system of claim 16, wherein constructing the first repository instance is performed in response to receiving the request for the first data from the terminal.

18. The system of claim 15, further comprising a memory, wherein the repository factory processor is configured to store the first repository instance in the memory.

19. The system of claim 18, wherein the service layer processor is further configured to fulfill a request for third data having the first TOS-specific format, the fulfilling comprising retrieving, via the repository factory processor, the stored first repository instance and requesting the third data using the first repository instance.

20. The system of claim 15, further comprising a memory, wherein the repository factory processor is configured to store the second repository instance in the memory.

21. The system of claim 20, wherein the service layer processor is further configured to fulfill a request for fourth data having the second TOS-specific format, the fulfilling comprising retrieving, via the repository factory processor, the stored second repository instance and requesting the fourth data using the second repository instance.

22. The system of claim 15, further comprising a presentation layer processor configured to display the second data.

23. The system of claim 15, wherein generating the second data comprises processing the first data into a TOS-agnostic format and performing additional processing on the first data.

24. The system of claim 15, wherein selecting the first instance type comprises determining a repository type based on the first TOS type.

25. The system of claim 24, wherein determining the repository type based on the first TOS type comprises identifying a repository type related to the first TOS type in a repository type cache.

26. The system of claim 25, wherein identifying the repository type related to the first TOS type comprises using at least one of a reflection operation, a helper attribute, and/or a convention to determine a relationship between the repository type and the first TOS type.

27. The system of claim 26, wherein using the reflection operation comprises discovering a TOS type that:
- is configured to implement interfaces configured with an inversion of control container;
- is contained in a namespace of interest; and/or
- comprises a TOS type attribute of interest and/or is contained in a sub-namespace named after a TOS type of interest.

28. The system of claim 15, wherein the first TOS type and the second TOS type are the same.

* * * * *